United States Patent [19]

Hashimoto et al.

[11] Patent Number: 5,990,940
[45] Date of Patent: Nov. 23, 1999

[54] VIDEO MONITOR SYSTEM WITH VIDEO MONITOR ADJUSTMENT MESSAGES OVERLAID ON THE VIDEO MONITOR

[75] Inventors: Masayuki Hashimoto; Tadahiko Hiraka; Hideo Katada; Yuichi Jinbo, all of Matto, Japan

[73] Assignee: Nanao Corporation, Matto, Japan

[21] Appl. No.: 08/750,466

[22] PCT Filed: Jun. 12, 1995

[86] PCT No.: PCT/JP95/01173

§ 371 Date: Dec. 13, 1996

§ 102(e) Date: Dec. 13, 1996

[87] PCT Pub. No.: WO95/34880

PCT Pub. Date: Dec. 21, 1995

[30] Foreign Application Priority Data

Jun. 14, 1994 [JP] Japan .................................. 6-131538
Jun. 14, 1994 [JP] Japan .................................. 6-132162
Jan. 20, 1995 [JP] Japan .................................. 7-007171

[51] Int. Cl.[6] .................................................. H04N 17/01
[52] U.S. Cl. ........................... 348/184; 348/581; 348/569
[58] Field of Search .................................. 348/189, 181, 348/190, 184, 581, 445, 441, 556, 569, 563, 554

[56] References Cited

U.S. PATENT DOCUMENTS

| 4,769,703 | 9/1988 | Osborne et al. ........................ 348/189 |
| 4,872,054 | 10/1989 | Gray et al. ............................... 348/441 |
| 4,907,082 | 3/1990 | Richards ................................. 348/569 |
| 5,173,778 | 12/1992 | Sasaki et al. ........................... 348/569 |
| 5,247,358 | 9/1993 | Richards ................................ 348/189 |
| 5,333,560 | 8/1994 | Yoshida . | |
| 5,359,543 | 10/1994 | Na .......................................... 348/189 |
| 5,420,643 | 5/1995 | Romesburg et al. .................. 348/581 |
| 5,448,288 | 9/1995 | Oue et al. .............................. 348/189 |
| 5,493,418 | 2/1996 | Takahashi et al. ..................... 348/581 |
| 5,617,147 | 4/1997 | Ezaki ..................................... 348/445 |
| 5,774,187 | 6/1998 | Tsunoda ................................. 348/569 |

FOREIGN PATENT DOCUMENTS

| 0298390 | 1/1989 | European Pat. Off. . |
| 43 36 116 | 5/1994 | Germany . |
| 5-293266 | 11/1993 | Japan . |
| 2 267 802 | 12/1993 | United Kingdom . |

*Primary Examiner*—Victor R. Kostak
*Attorney, Agent, or Firm*—Oblon, Spivak, McClelland, Maier & Neustadt, P.C.

[57] ABSTRACT

An adjustment system for a video monitor including a microprocessor, a D/A converter, an on-screen display controller circuit and an operator input unit. The microprocessor is configured to output adjustment signals to input circuits of the video monitor via the D/A converter and overlay a message concerning image adjustment on a display screen via the on-screen display controller circuit. The adjustment system corrects the problem of conventional adjustment systems wherein adjustment operation cannot be carried out unless an operator is fully aware of and skilled in the adjustment procedure.

16 Claims, 38 Drawing Sheets

HORIZONTAL SIZE

HORIZONTAL POSITION

VERTICAL SIZE

VERTICAL POSITION

SIDE-PINCUSHION DISTORTION

TRAPEZOIDAL DISTORTION

| Adjustment item (Abbreviation) | Adjustment item | OSD direction indicating icon | Circuit operation | Function |
|---|---|---|---|---|
| H-SIZE | Horizontal size | ↔ | Horizontal output circuit controls amplitude of horizontal deflection yoke current. | Horizontal size adjustment of on-screen picture. |
| H-POSITION | Horizontal position | ↔ | OSC circuit controls phase of horizontal pseudo-synchronizing signal. | Horizontal position adjustment of on-screen picture. |
| V-SIZE | Vertical size | ↕ | Vertical output circuit controls amplitude of vertical deflection yoke current. | Vertical size adjustment of on-screen picture. |
| V-POSITION | Vertical position | ↕ | Vertical output circuit controls DC current flowing in vertical deflection yoke. | Vertical position adjustment of on-screen picture. |
| SIDE-PINCUSHION | Side-pincushion distortion | ↕↕ | Horizontal output circuit performs vertical parabola modulation of horizontal deflection current. | Correction of horizontal bulging asymmetry of on-screen picture. |
| TRAPEZOIDAL | Trapezoidal distortion | ↕↕ | Horizontal output circuit performs sawtooth modulation of horizontal deflection current. | Correction of asymmetry of top and bottom sides. |
| SIDE-PIN BALANCE | Side-pin-balance distortion | ↔ | Distortion correction circuit controls phase of horizontal synchronizing signal. | Correction of horizontal bulging balance of on-screen picture. |

FIG. 18A

| Adjustment item (Abbreviation) | Adjustment item | OSD direction indicating icon | Circuit operation | Function |
|---|---|---|---|---|
| PARALLELOGRAM | Parallelogram distortion | ↑↓ | Distortion correction circuit controls phase of horizontal synchronizing signal. | Correction of inclination of left and right sides of on-screen picture. |
| H-CONVERGENCE | Horizontal convergence | ↑↓ ⇔ | Controls current flowing into convergence yoke. | Correction of color fringing in horizontal direction. |
| V-CONVERGENCE | Vertical convergence | ⇔ ↑↓ | Controls current flowing into convergence yoke. | Correction of color fringing in vertical direction. |
| TILT | Tilt | ↻ ↺ | Controls current flowing into tilt correction circuit. | Correction of inclination of whole on-screen picture. |
| CONTRAST | Contrast | 0-100% (numeral only) | Video preamplifier controls amplitudes of red, green and blue components. | Brightness adjustment of on-screen picture. |
| BRIGHTNESS | Brightness | 0-100% (numeral only) | Cut-off circuit controls DC levels of red, green and blue components. | Overall screen brightness adjustment. |
| SUB-CONTRAST | Sub-contrast | 0-100% and bar graph | Same as "Contrast" | Upper limit setting for contrast. |
| SUB-BRIGHTNESS | Sub-brightness | 0-100% and bar graph | G1 regulator circuit controls G1 voltage. | Background raster brightness adjustment. |
| RED CUT-OFF | Reference level for red | 0-100% and bar graph | Cut-off circuit controls DC level of red component. | Background raster color adjustment (red). |
| GREEN CUT-OFF | Reference level for green | 0-100% and bar graph | Cut-off circuit controls DC level of green component. | Background raster color adjustment (green). |
| BLUE CUT-OFF | Reference level for blue | 0-100% and bar graph | Cut-off circuit controls DC level of blue component. | Background raster color adjustment (blue). |

FIG. 18B

| Adjustment item (Abbreviation) | Adjustment item | OSD direction indicating icon | Circuit operation | Function |
|---|---|---|---|---|
| RED GAIN | Gain level for red | 0-100% and bar graph | Video preamplifier controls amplitude of red component. | Color adjustment of on-screen picture (red). |
| GREEN GAIN | Gain level for green | 0-100% and bar graph | Video preamplifier controls amplitude of green component. | Color adjustment of on-screen picture (green). |
| BLUE GAIN | Gain level for blue | 0-100% and bar graph | Video preamplifier controls amplitude of blue component. | Color adjustment of on-screen picture (blue). |
| ABL | Automatic beam limitation | | ABL circuit controls amplitudes of red, green and blue components. | Brilliance adjustment of entirely white screen. |
| H-MOIRE | Horizontal moire | ON (bar graph)-OFF | Moire canceling circuit controls phase of horizontal synchronizing signal. | Reduction of video moire. |
| V-MOIRE | Vertical moire | ON (bar graph)-OFF | Moire canceling circuit controls phase of vertical synchronizing signal. | Reduction of video moire. |

FIG. 18C

TIMING MEASUREMENT

| | | |
|---|---|---|
| Side-pincushion distortion | Horizontal output circuit performs vertical parabola modulation of horizontal deflection current. | Correction of horizontal bulging asymmetry of on-screen picture. |
| Trapezoidal distortion | Horizontal output circuit performs sawtooth modulation of horizontal deflection current. | Correction of asymmetry of top and bottom sides. |
| Side-pin-balance distortion | Distortion correction circuit controls phase of horizontal synchronizing signal. | Correction of horizontal bulging balance of on-screen picture. |
| Parallelogram distortion | Distortion correction circuit controls phase of horizontal synchronizing signal. | Correction of inclination of left and right sides of on-screen picture. |

FIG.27

VIDEO MONITOR SYSTEM WITH VIDEO MONITOR ADJUSTMENT MESSAGES OVERLAID ON THE VIDEO MONITOR

BACKGROUND OF THE INVENTION

1. Field of the Invention

The present invention pertains generally to a video monitor used in various computer systems and, more particularly, relates to a video monitor adjustment system for adjusting a displayed picture under the control of a microprocessor.

2. Discussion of Background

A conventionally known adjustment system for a video monitor comprising a cathode ray tube (CRT) employs a microprocessor built in the video monitor (Japanese Unexamined Patent Publication No. 3-35287).

For optimum adjustment of the picture quality of a video monitor, it is necessary to set operating parameters for a video amplifier circuit, a vertical deflection circuit, a horizontal deflection circuit, etc. to optimum values. If a microprocessor is utilized, it is possible to complete the process of video monitor adjustment by transmitting those operating parameters to specific elements, which need to be adjusted, through a digital-to-analog (D/A) converter. The microprocessor designed to perform such adjustment functions is provided with a nonvolatile memory for retaining these operating parameters. In addition, there is provided an operator input unit incorporating operating switches and a group of indicator lamps which makes it possible to select adjustment items and to increase or decrease specific operating parameters through the microprocessor.

Although it is possible to automatically adjust such operating parameters in accordance with operation of different computer systems in the prior art technology, an operator is required to be completely aware of and skilled in every process of adjustment since the aforementioned adjustment system is not provided with any message display functions except for the indicator lamps incorporated in the accompanying operator input unit. Furthermore, the adjustment system inevitably requires a rather complicated adjustment procedure.

With technological advances in personal computers, video monitors used as display terminals of computer systems are required to provide interchangeability. Specifically, if video signals which are input to a specific video monitor do not conform to standardized specifications, video signal timing may not match the video monitor and displayed data would not necessarily appear at the center of its screen. To prevent this kind of problems, a technique has thus far been proposed that makes it possible to present video signals at the center of the CRT screen regardless of video signal specifications (e.g., Japanese Unexamined Patent Publication No. 5-27698).

According to this technique, there is provided a control circuit comprising a central processing unit (CPU) for measuring input video signal timing. Specifically, the control circuit measures a period of time from a leading edge of a horizontal synchronizing signal to a leading edge of a video signal and that from a leading edge of a vertical synchronizing signal to a leading edge of the video signal. (These periods of time are hereinafter referred to as horizontal display start time and vertical display start time, respectively.) The control circuit can adjust phases of a horizontal timing signal in a horizontal deflection circuit and of a vertical timing signal in a vertical deflection circuit in accordance with the measurement results so that the horizontal and vertical positions of a displayed picture correctly align with the center of the CRT screen. With this control circuit, it becomes possible to automatically position the displayed data at the center of the screen. In other words, the control circuit can automate horizontal position adjustment and vertical position adjustment.

However, the aforementioned control circuit has a problem in that its time measuring accuracy and its picture positioning accuracy are insufficient. This is because the control circuit does not have any function to adjust the size of the displayed picture and it simply measures the horizontal and vertical display start times as the input video signal timing by using a timer built in the CPU. Another problem of this control circuit is that it is applicable to limited types of input video signals since its operation is based on the assumption that the horizontal and vertical deflection frequencies of an input video signal are held constant.

SUMMARY OF THE INVENTION

It is therefore a first object of the invention to provide a video monitor adjustment system comprising a microprocessor, an on-screen display controller circuit and an operator input unit for adjusting the picture quality of a video monitor, wherein the adjustment system overlays various messages needed for adjustment on a display screen of the video monitor so that the adjustment operation can be carried out properly and efficiently.

It is a second object of the invention to provide an automatic video monitor adjustment system comprising a dedicated measuring circuit for measuring the timing of an input video signal including its horizontal scanning period and vertical scanning period and a microprocessor for adjusting the picture size of a video monitor, whereby the on-screen picture size can be adjusted automatically with extremely high accuracy even when the horizontal and vertical scanning frequencies of the input video signal fluctuate.

It is a third object of the invention to provide an automatic video monitor adjustment system which makes it possible to arbitrarily set the on-screen picture size by use of the same microprocessor provided for accomplishing the second object described above.

DISCLOSURE OF THE INVENTION

According to this invention for achieving the aforementioned first object (hereinafter referred to as the first invention), a video monitor adjustment system comprises a microprocessor for transmitting an adjustment signal to a specific part of a video monitor through a D/A converter, an on-screen display controller circuit for overlaying a message for picture adjustment on a display screen of the video monitor in response to a display request received from the microprocessor, and an operator input unit connected to the microprocessor. With this construction, the adjustment operation can be carried out properly and efficiently.

The aforementioned operator input unit may include a combination of an operating switch and a rotary encoder.

Preferably, the aforementioned microprocessor present an indicating icon on the display screen depending on whether an operating parameter entering from the rotary encoder is varied in its increasing direction or decreasing direction. Furthermore, the microprocessor may have a function to display a help message and the ability to scroll the help message in accordance with operation of the rotary encoder. In addition, the microprocessor may have a function to alter the display size of the message.

Instead of the aforementioned notary encoder, an operating switch may be provided which can be operated to either increase or decrease the operated to the operating parameter.

The aforementioned microprocessor may have the ability to measure the vertical and horizontal scanning frequencies of an input signal and display an error message on the display screen when the input signal does not comply with display specifications of the video monitor. Furthermore, the microprocessor may have the ability to display an error message on the display screen when no input signal is present.

The aforementioned microprocessor can isolate a horizontal deflection circuit from a synchronization processing circuit when outputting an error message, determine the horizontal oscillating frequency via the D/A converter, cause the vertical oscillating frequency to follow the horizontal oscillating frequency, and switch a clamping circuit to the horizontal deflection circuit when outputting the error message. The microprocessor can also isolate a video amplifier circuit from an input terminal when outputting an error message.

Furthermore, the operator input unit may be provided with an operating switch for directly selecting a specific adjustment item.

According to the construction of the first invention, the microprocessor transmits adjustment signals to input circuits of the video monitor, such as the video amplifier circuit, vertical deflection circuit and horizontal deflection circuit, through the D/A converter and varies operating parameters contained in the adjustment signals so that optimum picture quality can be obtained. Adjustment items include brightness, contrast, horizontal size, horizontal position, vertical size, vertical position, side-pincushion distortion, trapezoidal distortion, horizontal convergence, vertical convergence, tilt, horizontal moire, color temperature level, reference levels for red, green and blue, gain levels for red, green and blue and sub-contrast, for example.

The microprocessor can overlay a message, which is selected in accordance with specific adjustment operation, on the display screen of the video monitor via the on-screen display controller circuit so that appropriate instructions can be given to an operator. During the adjustment operation, the display screen presents an image used for adjustment, such as a crosshatch pattern, with a corresponding input signal to an input terminal of the video monitor. The message is therefore overlaid on such an image for adjustment. The message may contain a series of characters string as well as arbitrary symbols including indicating icons. Each character and each symbol may be displayed with, or without special circumscription.

If the operator input unit is constructed based on a combination of an operating switch and a rotary encoder, the rotary encoder can be used for selecting an adjustment item or for varying an operating parameter in its increasing or decreasing direction while the operating switch can be used for confirming the selection of the adjustment item or the setting of the operating parameter. In this case, the rotary encoder can be rotated endlessly clockwise or counterclockwise and it can transmit an electrical pulse signal, containing information about its turning direction, to the microprocessor each time it is rotated at predetermined amount. As a result, the microprocessor can vary the value of the selected operating parameter on a real-time basis in accordance with rotation of the rotary encoder. If the operating switch is pressed when optimum picture quality is obtained, the value of the operating parameter at that point can be input to a nonvolatile memory and preserved therein.

The rotary encoder may be replaced by an operating switch which can be operated to either increase or decrease the operating parameter. In this case, the operating switch may be composed of a pair of push-button switches or a single bidirectional changeover switch.

The microprocessor may be configured to display an error message on the display screen, which visually indicates that the input signal does not comply with the display specifications or the input signal is absent. In this case, a failure of the video monitor itself and a failure of the input signal source can be clearly distinguished from each other.

The microprocessor can execute such switching operation as isolating the horizontal deflection circuit from the synchronization processing circuit, for example, and cause the horizontal deflection circuit and vertical deflection circuit to operate at specific horizontal and vertical oscillating frequencies. This makes it possible to stably present an error message of a specific size at a specific position on the display screen via the on-screen display controller circuit. If the video amplifier circuit is also isolated from the input terminal, it is possible to securely prevent such inconvenience that noise, entering through the input terminal when there is not actually an input signal, creates an unwanted image outside the error message display area, disturbing observation of the screen.

If the operator input unit is provided with the operating switch for directly selecting an adjustment item, the microprocessor can directly select a specific adjustment item and start adjustment operation, without going through a main menu or an adjustment menu, when the operating switch is operated.

According to the invention for achieving the aforementioned second object (hereinafter referred to as the second invention), a video monitor adjustment system comprises a microprocessor which transmits a horizontal size setting signal to a horizontal deflection circuit of a video monitor and a vertical size setting signal to its vertical deflection circuit through a D/A converter (digital-to-analog converter) and a measuring circuit for measuring the timing of an input video signal including its horizontal scanning period and vertical scanning period, wherein the microprocessor calculates effective scanning ratios (which denote the ratio of the horizontal scanning period to horizontal display time and the ratio of the vertical scanning period to vertical display time) of the input video signal based on the measurement results fed from the measuring circuit, and outputs the horizontal size setting signal and vertical size setting signal, containing, respectively, a horizontal size setting value and a vertical size setting value corresponding to the effective scanning ratios.

According to the second invention, the on-screen picture size can be adjusted automatically with extremely high accuracy even when the horizontal and vertical scanning frequencies of the input video signal fluctuate. Thus, the second invention has an advantage in that it can cope with wide variations in input video signal specifications.

The aforementioned measuring circuit can measure the operating timing of the horizontal deflection circuit, and the microprocessor can calculate a horizontal position setting value based on the measurement results fed from the measuring circuit and transmit a horizontal position setting signal to the horizontal deflection circuit through the D/A converter. Also, the measuring circuit can measure the operating timing of the vertical deflection circuit, and the microprocessor can calculate a vertical position setting value based on the measurement results fed from the measuring circuit and transmit a vertical position setting signal to the vertical deflection circuit through the D/A converter.

Furthermore, the measuring circuit can measure a minimum value of horizontal display start time and a maximum value of horizontal display end time (which denotes the period of time from a horizontal synchronizing signal to a trailing edge of the video signal) in one vertical scanning period of a displayed picture. A video signal, which is output from a video amplifier, is input to the measuring circuit via a mixer.

Preferably, the microprocessor is configured to be automatically activated each time the measuring circuit detects a variation in the input video signal and to calculate the horizontal size setting value upon correcting frequency-dependent characteristics of the horizontal deflection circuit. In a case where the measuring circuit receives the video signal output from the video amplifier, the microprocessor can transmit gain setting signals for individual colors and a contrast setting signal to the video amplifier through the D/A converter when the measuring circuit measures the input video signal timing.

According to the construction of the second invention, the measuring circuit measures the timing of the input video signal while the microprocessor calculates the effective scanning ratios of the input video signal based on the measurement results fed from the measuring circuit and outputs the horizontal size setting signal and vertical size setting signal, containing the horizontal size setting value and vertical size setting value corresponding to the effective scanning ratios to the horizontal deflection circuit and vertical deflection circuit, respectively. This makes it possible to automatically adjust the displayed picture to an optimum size regardless of input video signal specifications. This is because the effective scanning ratios are proportional to the horizontal size and vertical size of the displayed picture. Since the measuring circuit measures both the horizontal and vertical scanning frequencies, the microprocessor can calculate the correct horizontal size setting value and vertical size setting value based on the measurement results even when the horizontal and vertical scanning frequencies of the input video signal fluctuate.

When calculating the horizontal position setting value, using the operating timing of the horizontal deflection circuit measured by the measuring circuit, the microprocessor can automatically adjust the horizontal position of the displayed picture with high accuracy even when the horizontal scanning frequency of the input video signal fluctuates. Fluctuation in the operational delay of the horizontal deflection circuit, that is caused by stray capacitance in circuitry, for example, occurs when the horizontal scanning frequency fluctuates. The microprocessor of this invention can determine the actual operating timing of the horizontal deflection circuit by using the measurement results fed from the measuring circuit and thereby efficiently corrects horizontal position errors caused by the operational delay of the horizontal deflection circuit.

Also when calculating the vertical position setting value, using the operating timing of the vertical deflection circuit measured by the measuring circuit, the microprocessor can automatically adjust the vertical position of the displayed picture with high accuracy. This is because the measuring circuit measures the actual operating timing and feeds it back to the microprocessor.

When the measuring circuit measures the minimum value of horizontal display start time and the maximum value of horizontal display end time, the input video signal used for automatic adjustment of the size or position of the displayed picture presents an arbitrary image containing at least one each bright spot at the left and right edges of the display screen. This means that the displayed picture is not necessarily limited to such adjustment images as a solid image or a crosshatch pattern. Similarly, when the measuring circuit measures the vertical display start time and vertical display end time (which denotes the period of time from a vertical synchronizing signal to a trailing edge of the video signal) in one vertical scanning period of the displayed picture, an arbitrary image containing at least one each bright spot at the upper-left and lower-right corners of the display screen can be used as an adjustment image. Furthermore, each video signal, which is output from the video amplifier, is fed into the measuring circuit via the mixer. The mixer adds up video signal components for individual colors and then transmits the resultant signal to the measuring circuit. In this case, the adjustment image is not limited to an entirely white image, but may be a red, green or blue single-color image.

If the microprocessor is configured to be automatically activated each time the measuring circuit detects a variation in the input video signal, the microprocessor automatically becomes operative in response to the input of a new video signal and performs automatic adjustment of the size or position of the displayed picture. In this case, the microprocessor may simultaneously carry out the correction of picture distortions including side-pincushion distortion, trapezoidal distortion, side-pine-balance distortion and parallelogram distortion.

When the microprocessor corrects frequency-dependent characteristics of the horizontal deflection circuit, more accurate adjustment of the horizontal size can be accomplished. Typically, loss in the output circuitry of the horizontal deflection circuit increases and the horizontal size of the displayed picture linearly decreases as the horizontal scanning frequency increases. In this invention, the microprocessor can effectively correct the reducing tendency of the horizontal size by correcting the relationship between the effective scanning ratio and the horizontal size setting value, based on the horizontal scanning frequency. In this case, the microprocessor may additionally perform a linearity correction of the horizontal deflection circuit. The linearity correction refers to an operation for correcting the reducing tendency of the horizontal size which becomes discontinuous with respect to the horizontal scanning frequency when S correction capacitors, inserted in a horizontal deflection coil, are switched discontinuously with respect to the horizontal scanning frequency. When calculating a horizontal size setting value for the linearity correction, the microprocessor should make an additional correction to eliminate the discontinuity of the horizontal size.

When the microprocessor outputs the gain setting signals for the individual colors and the contrast setting signal to the video amplifier, the video amplifier can increase gains for the individual colors and thereby output a large video signal. Therefore, the measuring circuit can stably perform its measuring operation even when the externally input video signal is small.

According to the invention for achieving the aforementioned third object (hereinafter referred to as the third invention), a video monitor adjustment system comprises a microprocessor which transmits a horizontal size setting signal to a horizontal deflection circuit of a video monitor and a vertical size setting signal to its vertical deflection circuit through a D/A converter, and an operating switch and a rotary encoder which are connected to the microprocessor, wherein the microprocessor is activated by the operating switch, increments or decrements a horizontal size setting value and a vertical size setting value in accordance with an increase or a decrease in the value of an operating parameter entering through the rotary encoder, and outputs the horizontal size setting signal and vertical size setting signal, containing resultant setting values, to the video monitor. In this construction, the rotary encoder may be replaced by an operating switch which can be operated to either increase or decrease the operating parameter.

According to the third invention, it is possible to manually adjust the horizontal size of the displayed picture by using the microprocessor of the second invention as it is and to realize further improved operability by integrating vertical size and horizontal size adjusting functions. According to the construction of the third invention, the microprocessor is activated by the operating switch and increments or decrements the horizontal size setting value and vertical size setting value in accordance with an increase or a decrease in the value of the operating parameter entering through the rotary encoder. This makes it possible to arbitrarily adjust the size of the displayed picture by manual operation of the rotary encoder and to eliminate the need for adjusting the horizontal size and vertical size separately. In this invention, both the horizontal size setting value and the vertical size setting value are incremented or decremented simultaneously while maintaining a specific ratio therebetween.

When the rotary encoder is replaced by an operating switch, the same adjustment operation as described above can be performed by manipulating the operating switch in the increasing or decreasing direction of the operating parameter, instead of turning the rotary encoder.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein:

FIG. 18 is a list showing the contents of adjustment items;

FIG. 27 is a list showing the contents of distortion corrections;

DESCRIPTION OF THE PREFERRED EMBODIMENTS

Figure 1:
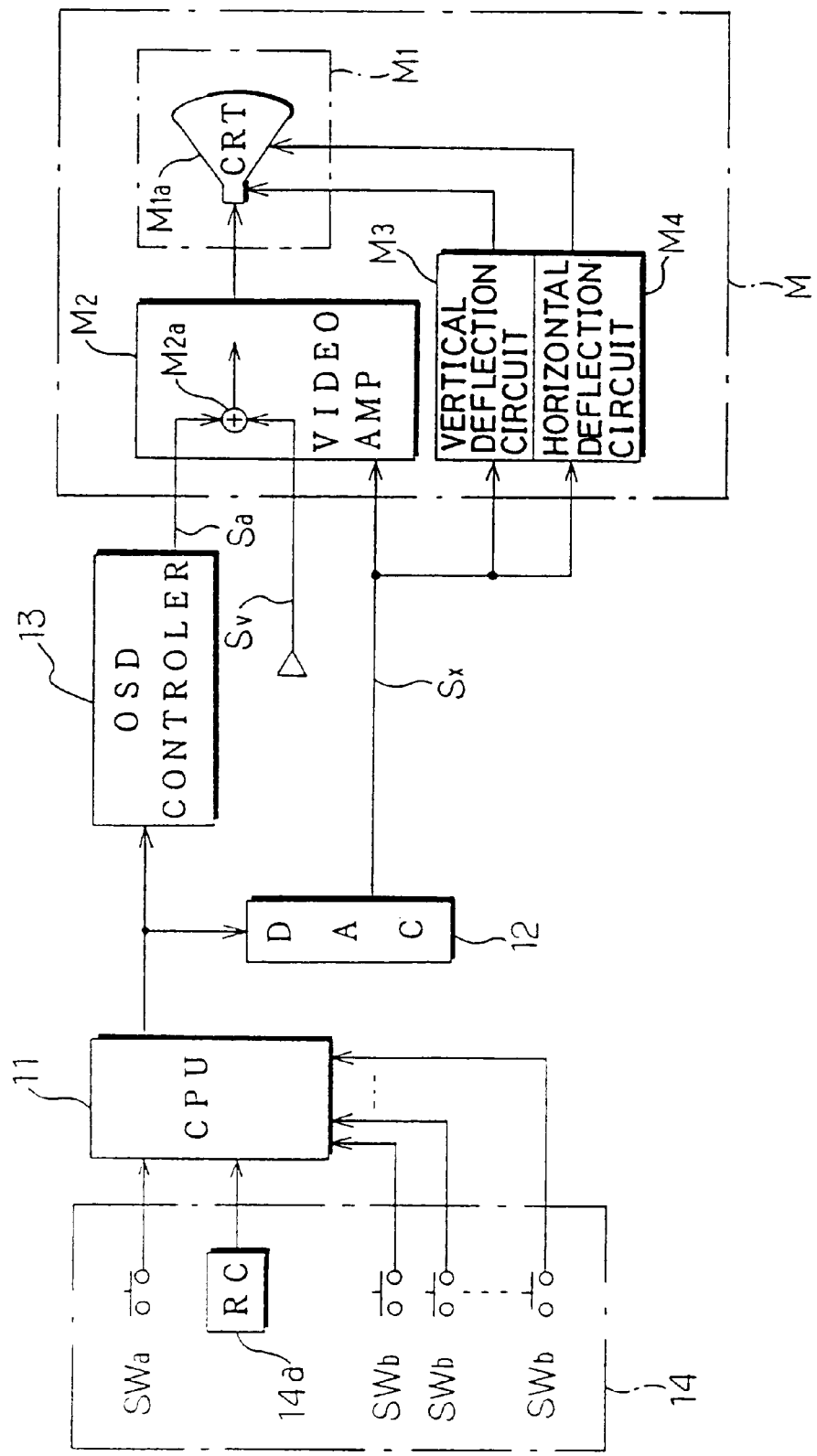
FIG. 1 is a block diagram showing a basic construction according to the first invention.

Referring now to the drawings, wherein like reference numerals designate identical or corresponding parts throughout the several views, and more particularly to FIGS. 1 to 10 thereof, there is illustrated diagrams showing a video monitor adjustment system according to the first invention. Referring to FIG. 1, the video monitor adjustment system mainly comprises a microprocessor 11, a D/A converter 12, an on-screen display controller circuit 13 and an operator input unit 14.

A video monitor M comprises a display section M1 including a color CRT M1a, a video amplifier M2, a vertical deflection circuit M3 and a horizontal deflection circuit M4. The video amplifier M2 incorporates a mixer M2a for mixing an externally input video signal Sv and a video signal Sa fed from the on-screen display controller circuit 13.

The operator input unit 14 includes an operating switch SWa, a rotary encoder 14a and other operating switches SWb, and these components are all connected to the microprocessor 11. The D/A converter 12 and the on-screen display controller circuit 13 are both connected to an output bus of the microprocessor 11. Outputs of the D/A converter 12 are individually connected to the video amplifier M2, vertical deflection circuit M3 and horizontal deflection circuit M4, all of which are input circuits of the video monitor M. The D/A converter 12 is of a multichannel type which is selectively operated in accordance with addresses specified by the microprocessor 11. The outputs of the D/A converter 12 are assigned to specific channels depending on which operating parameters are input to the individual input circuits of the video monitor M. The outputs are transmitted in the form of separate adjustment signals Sx to the relevant input circuits.

Figure 2:
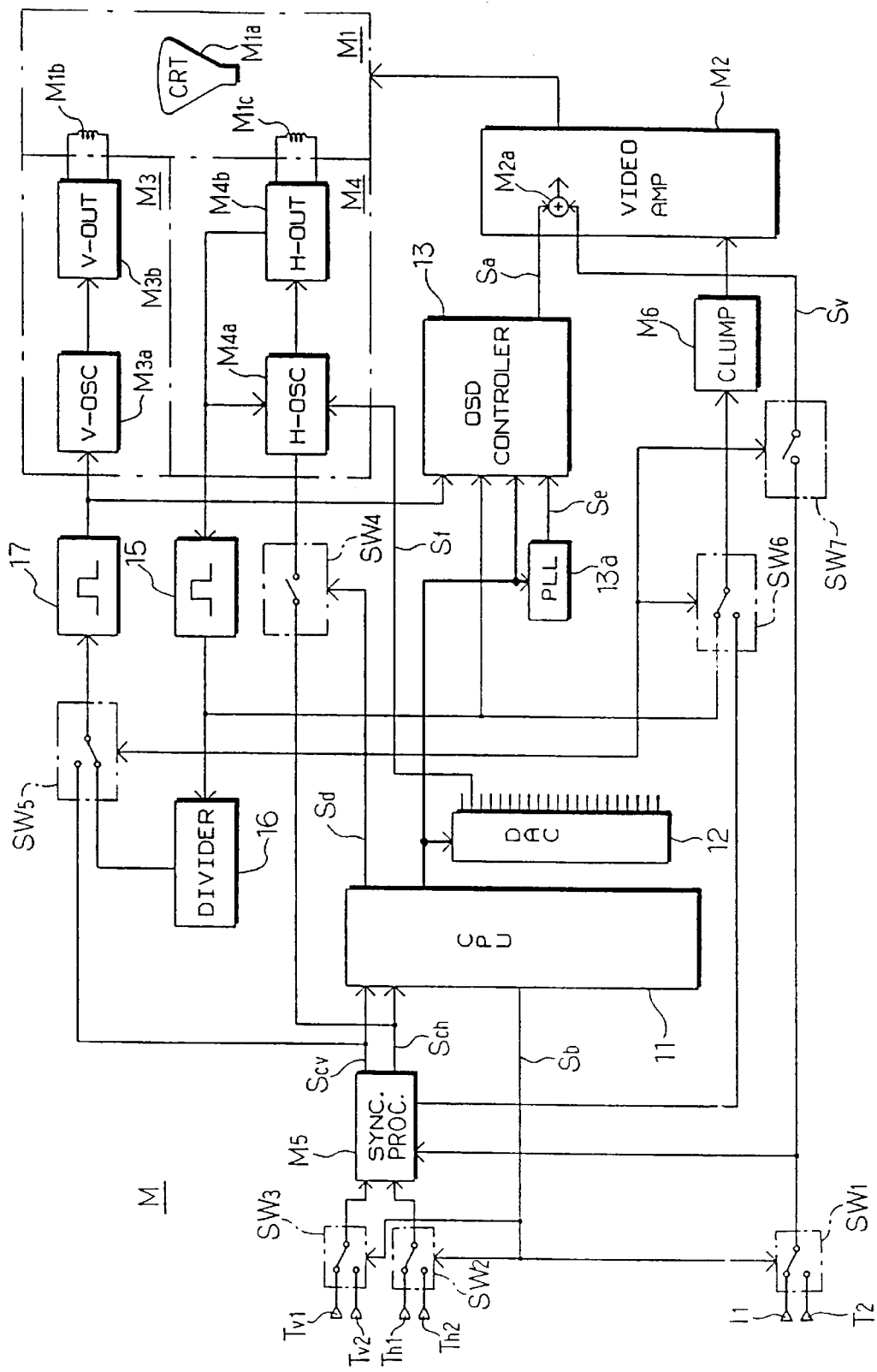
FIG. 2 is a block diagram showing a construction in which the first invention is embodied in a video monitor.

Unlike the construction shown in FIG. 1, the microprocessor 11, D/A converter 12 and on-screen display controller circuit 13 may be integrally incorporated into the video monitor M as shown in FIG. 2. The operator input unit 14 is installed where an operator can easily operate it, for example, beneath the display section outside the later-described, case of the video monitor. The video monitor M has two sets of input terminals Ti, Thi and Tvi (where i=1 or 2). An input signal containing a video signal is input to one input terminal Ti while a horizontal synchronizing signal and a vertical synchronizing signal are entered to one input terminal Thi and one input terminal Tvi, respectively. The input terminals Ti, Thi and Tvi are connected to a synchronization processing circuit M5 via changeover switches SW1, SW2 and SW3, respectively. The changeover switches SW1, SW2 and SW3 can be turned to one set of input terminals Ti, Thi and Tvi by a common switching signal Sb. The input terminals Ti is connected to the mixer M2a in the video amplifier M2 via the changeover switch SW1 and another changeover switch SW7.

A horizontal synchronizing signal Sch and a vertical synchronizing signal Scv, which are output from the synchronization processing circuit M5, are individually input to the microprocessor 11. The horizontal synchronizing signal Sch branches out and enters a horizontal oscillator M4a in the horizontal deflection circuit M4 via a changeover switch SW4. Also, the vertical synchronizing signal Scv branches out and enters a vertical oscillator M3a in the vertical deflection circuit M3 via a changeover switch SW5 and a waveform shaping circuit 17.

In the horizontal deflection circuit M4, the horizontal oscillator M4a and a horizontal output circuit M4b are connected in series, and an output of the horizontal output circuit M4b is connected to a horizontal deflection coil M1c. In the vertical deflection circuit M3, the vertical oscillator M3a and a vertical output circuit M3b are connected in series, and an output of the vertical output circuit M3b is connected to a vertical deflection coil M1b. Another output of the horizontal output circuit M4b is fed back to the horizontal oscillator M4a and connected also to a first fixed contact of the changeover switch SW5 via a waveform shaping circuit 15 and a divider 16.

Outputs from the waveform shaping circuits 15 and 17 branch out and are individually connected to the on-screen display controller circuit 13 as well. The output from the waveform shaping circuit 15 is also fed into the video amplifier M2, together with another output from the synchronization processing circuit M5, via a changeover switch SW6 and a clamping circuit M6. A phase-lock loop oscillator 13a which is controlled by an output from the microprocessor 11 is connected to the on-screen display controller circuit 13, and a clock signal Se which is output from the oscillator 13a is fed into the on-screen display controller circuit 13. A control signal Sf transmitted from an output terminal of the D/A converter 12 is fed into the horizontal oscillator M4a.

The changeover switches SW4, SW5, SW6 and SW7 simultaneously open or close in response to a common switching signal Sd which is output from the microprocessor 11.

When a video signal, a horizontal synchronizing signal and a vertical synchronizing signal are input to one set of input terminals Ti, Thi and Tvi, the video signal is delivered to the mixer M2a in the video amplifier M2 as a video signal Sv via the changeover switches SW1 and SW7 while the horizontal synchronizing signal and vertical synchronizing signal are fed into the horizontal deflection circuit M4 and vertical deflection circuit M3 via the changeover switches SW2 and SW3, synchronization processing circuit M5 and changeover switches SW4 and SW5, respectively. Consequently, the video monitor M can present a specific image on the display section M1 in accordance with the externally input video signal. The changeover switches SW1, SW2 and SW3 must be turned to a position where the input signals are present in response to the switching signal Sb fed from the microprocessor 11 while the changeover switches SW4 and SW7 must close and the changeover switches SW5 and SW6 must be turned to the synchronization processing circuit M5 in response to the switching signal Sd also fed from the microprocessor 11.

If the video signal which is input to the relevant input terminal Ti is a composite video signal containing synchronizing signals, the synchronization processing circuit M5 works as a sync-separator circuit. Further, the video signal which is input to one of the input terminals Ti serves to present a crosshatch pattern composed of white lines when the video monitor M is adjusted with the adjustment system including the microprocessor 11.

Figure 3:
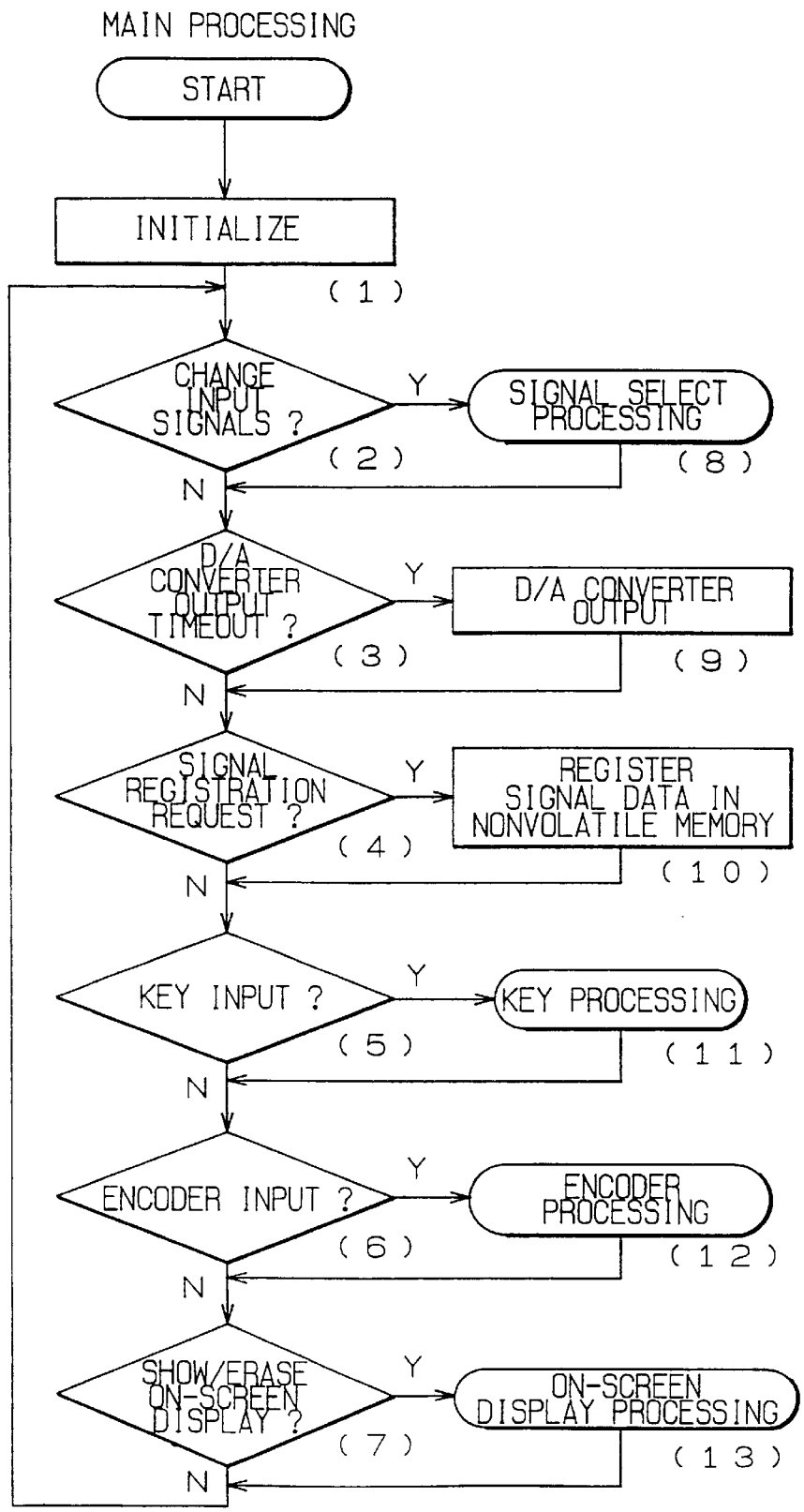
FIG. 3 is a general flowchart showing the main processing of the first invention.

The microrocessor 11 is activated when the video monitor M is powered on and runs a main processing routine which is shown in FIG. 3. The operation flow begins with system initialization (step 1 shown in FIG. 3), which is followed by initiation of a signal select processing routine (step 2 to step 8). Immediately upon power-on, the microprocessor 11 begins to execute a vertical synchronizing signal interrupt routine (FIG. 4(A)) each time the vertical synchronizing signal Scv occurs. Specifically, the microprocessor 11 measures the vertical synchronizing signal Scv and horizontal synchronizing signal Sch (steps 1 through 3 shown in FIG. 4(A)) each time the vertical synchronizing signal Scv occurs in order to determine the horizontal and vertical scanning frequencies of the externally input video signal.

Figure 5:
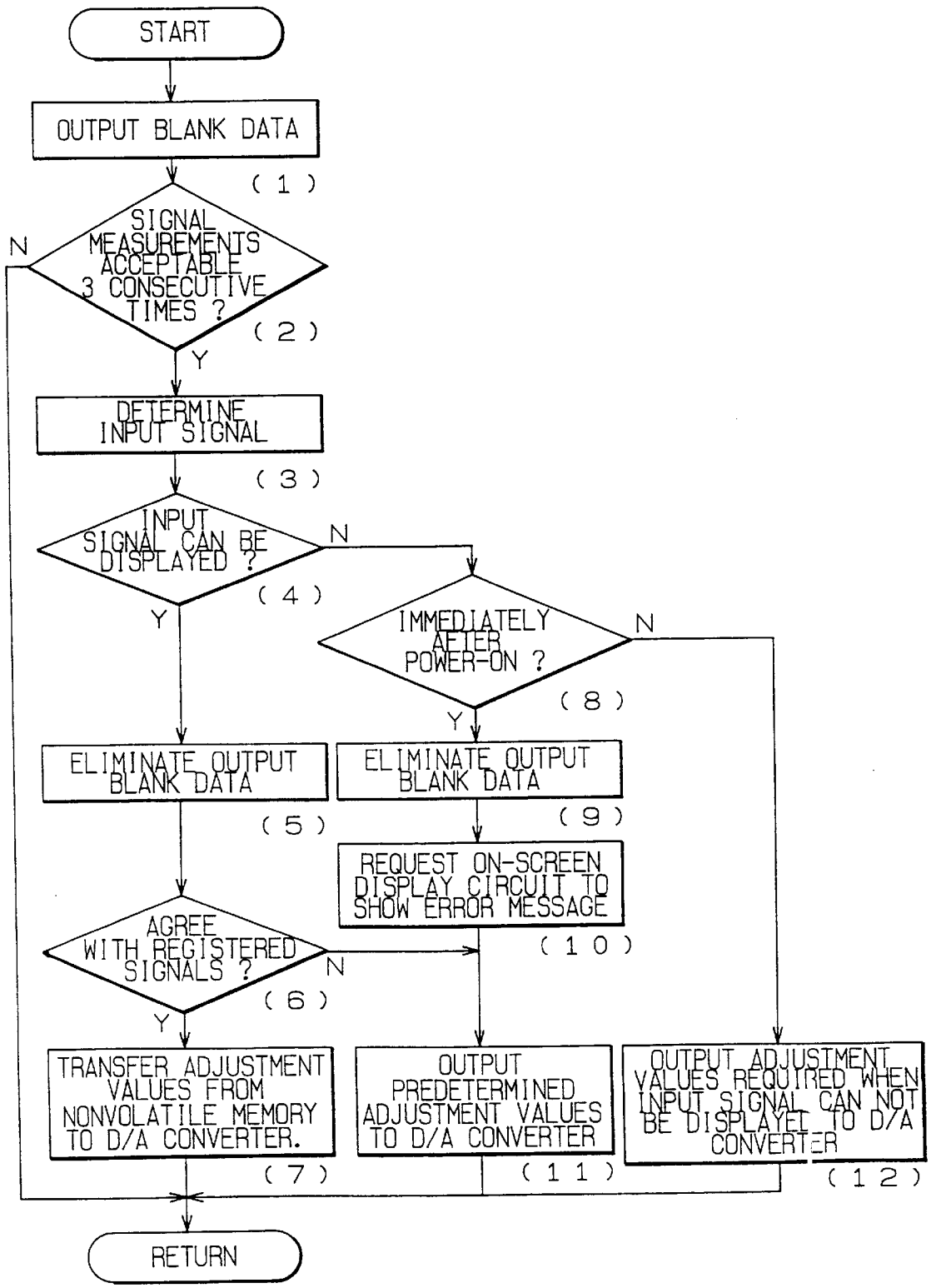
FIG. 5 is a flowchart showing the signal select processing.

As shown in FIG. 5, the aforementioned signal select processing routine begins with outputting blank data to the on-screen display controller circuit 13 (step 1) to cause the screen of the color CRT M1a to be entirely black. Since the on-screen display controller circuit 13 generates a video signal Sa that makes the screen entirely black and outputs it to the mixer M2a in the video amplifier M2, the whole screen becomes black regardless of the externally input video signal.

When it is confirmed that the measured horizontal and vertical scanning frequencies fall within a range defined in display specifications of the video monitor M (steps 2 through 4), the blank data output is eliminated to reset the screen to normal display (step 5). Then, it is determined whether the horizontal and vertical scanning frequencies agree with those of signals previously registered in an unillustrated memory (step 6). When it is determined that they do, stored adjustment values corresponding to the registered signals are read out from a nonvolatile memory and are output to the D/A converter 12 (step 7). As a result, the D/A converter 12 can output adjustment signals Sx, which correspond to the adjustment values read from the nonvolatile memory, to the individual input circuits of the video monitor M including the video amplifier M2, vertical deflection circuit M3 and horizontal deflection circuit M4 so that the display section M1 can present the externally input video signal with optimum picture quality.

When the horizontal and vertical scanning frequencies do not agree with those of the registered signals in step 6, predetermined adjustment values are read out and are input to the D/A converter 12 (step 11).

Figure 10:
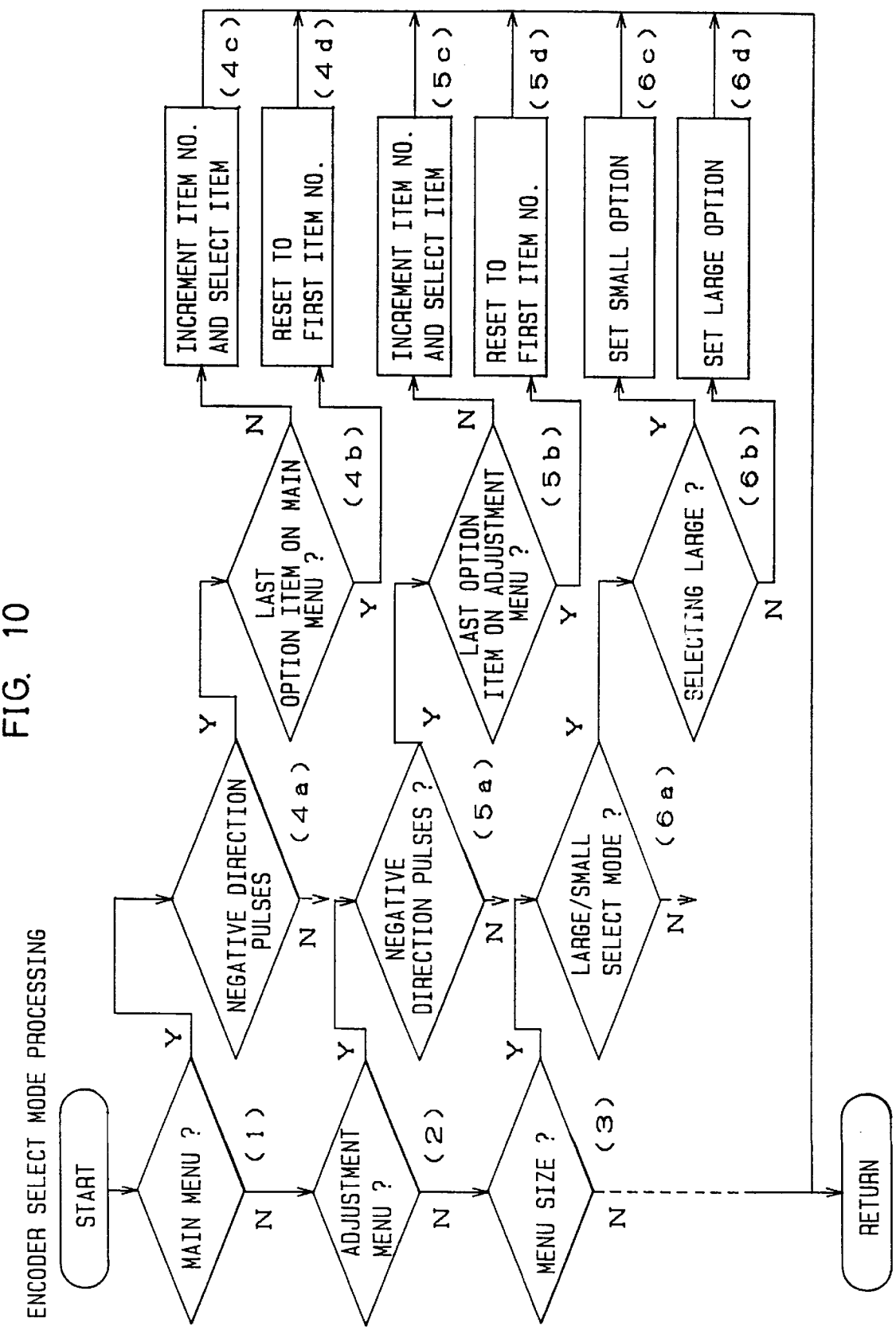
FIG. 10 is a flowchart showing the encoder select mode processing.
Figure 14A:
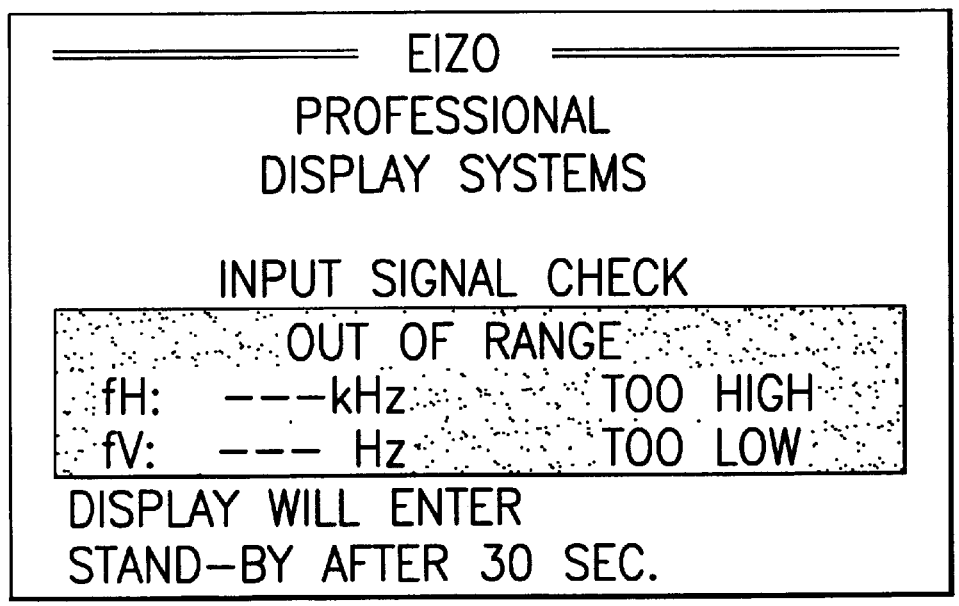
FIGS. 14(A) and 14(B) are diagrams showing examples of on-screen messages.
Figure 14B:
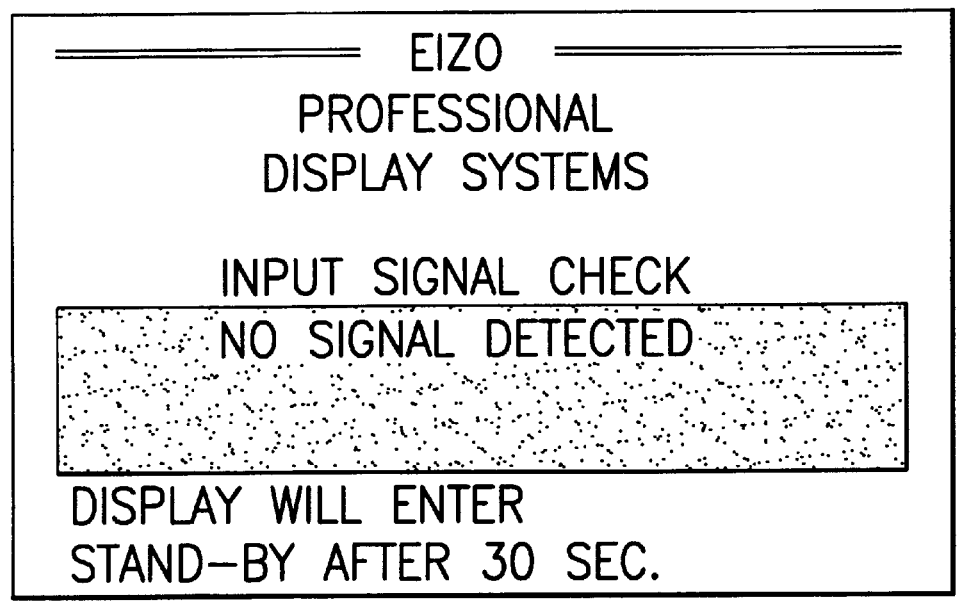

When it is not determined that the measured horizontal and vertical scanning frequencies fall within the range defined in the display specifications of the video monitor M in step 4, it is further determined whether the video monitor M has just been powered on (step 8). When it is determined that it has, the blank data output is eliminated (step 9) and a display request is transmitted to the on-screen display controller circuit 13, requesting it to show an error message (step 10). This allows the display section M1 to present an error message as shown in FIG. 14(A) or 14(B), for example. The display request issued in step 10 of FIG. 10 is checked in step 7 of the main processing routine shown in FIG. 3. If it is certainly a display request, the operation flow proceeds to steps 2 and 6 of an on-screen display processing routine shown in FIG. 11, in which a first error message of FIG. 14(A) showing that the input signal does not conform to the display specifications, or a second error message of FIG. 14(B) showing that no input signal is detected is selected (step 10 or 11).

When the microprocessor 11 find that the input signal does not conform to the display specifications or no input signal is present, it transmits a control signal Sf to the horizontal oscillator M4a via the D/A converter 12 (FIG. 2) so that the horizontal deflection circuit M4 is automatically set to a specific horizontal oscillating frequency. At the same time, the microprocessor 11 produces a switching signal Sd which causes the changeover switch SW4 to open to isolate the horizontal deflection circuit M4 from the synchronization processing circuit M5, the changeover switch SW5 to be turned to the divider 16 so that the oscillating frequency of the vertical oscillator M3a follows the horizontal oscillating frequency, and the changeover switch SW6 to be turned to the waveform shaping circuit 15 so that the clamping circuit M6 is connected to the horizontal deflection circuit M4. Furthermore, the microprocessor 11 transmits data to the oscillator 13a, causing it to generate a clock signal Se conforming to the horizontal oscillating frequency. As a result, the on-screen display controller circuit 13 can stably present a specific error message of an appropriate size on the display section M1 in an appropriate display position.

In this condition, an externally inout video signal is cut off since the changeover switch SW7 is opened by the microprocessor 11 to disconnect the video amplifier M2 from the input terminals Ti. It is therefore possible to prevent disturbances to images presented on the display section M1 even if unwanted noise is introduced into the video input line connected to the input terminals Ti when the changeover switch SW1 is alternately switched between the two input terminals Ti, for instance.

When it is not determined that the input signal conforms to the display specifications or any input signal is present in the signal select processing routine shown in FIG. 5, other than during a period immediately after power-on (step 4 to step 8), the microprocessor 11 transmits adjustment values, corresponding to a standby status in which the horizontal size of the on-screen picture is minimized, to the D/A converter 12 (step 12), for instance, and sets the whole video monitor M to a standby condition. As an alternative, the microprocessor 11 may output a specific error message similar to one displayed immediately after power-on.

Thereafter, the operating switch SWa of the operator input unit 14 is pressed to reactivate reactivating the adjustment function of the microprocessor 11. When the operating switch SWa is pressed, a key input is detected in step 5 of the main processing routine shown in FIG. 3, and then a key processing routine is executed (step 11).

Figure 6:
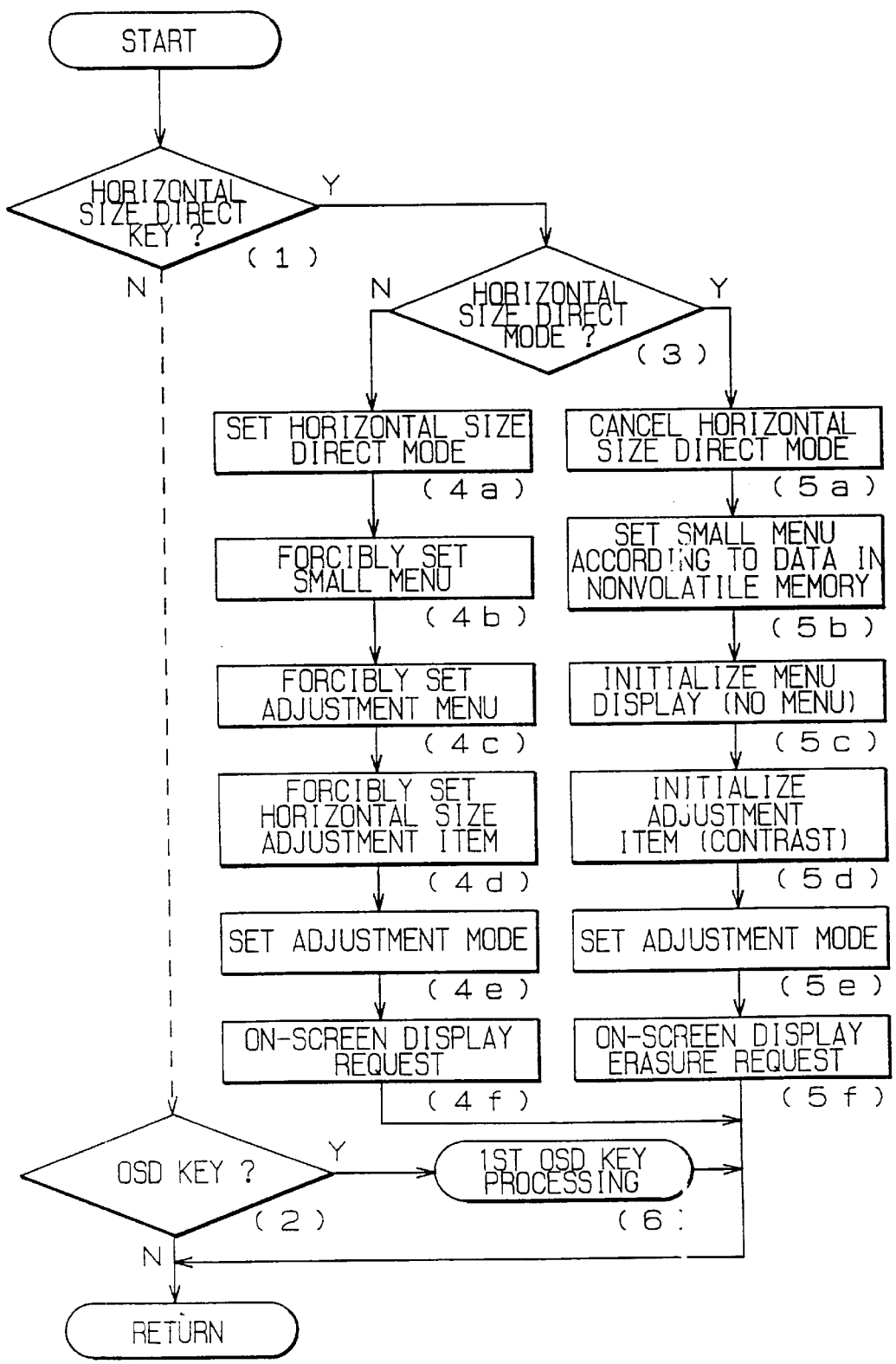
FIG. 6 is a flowchart showing the key processing.
Figure 11:
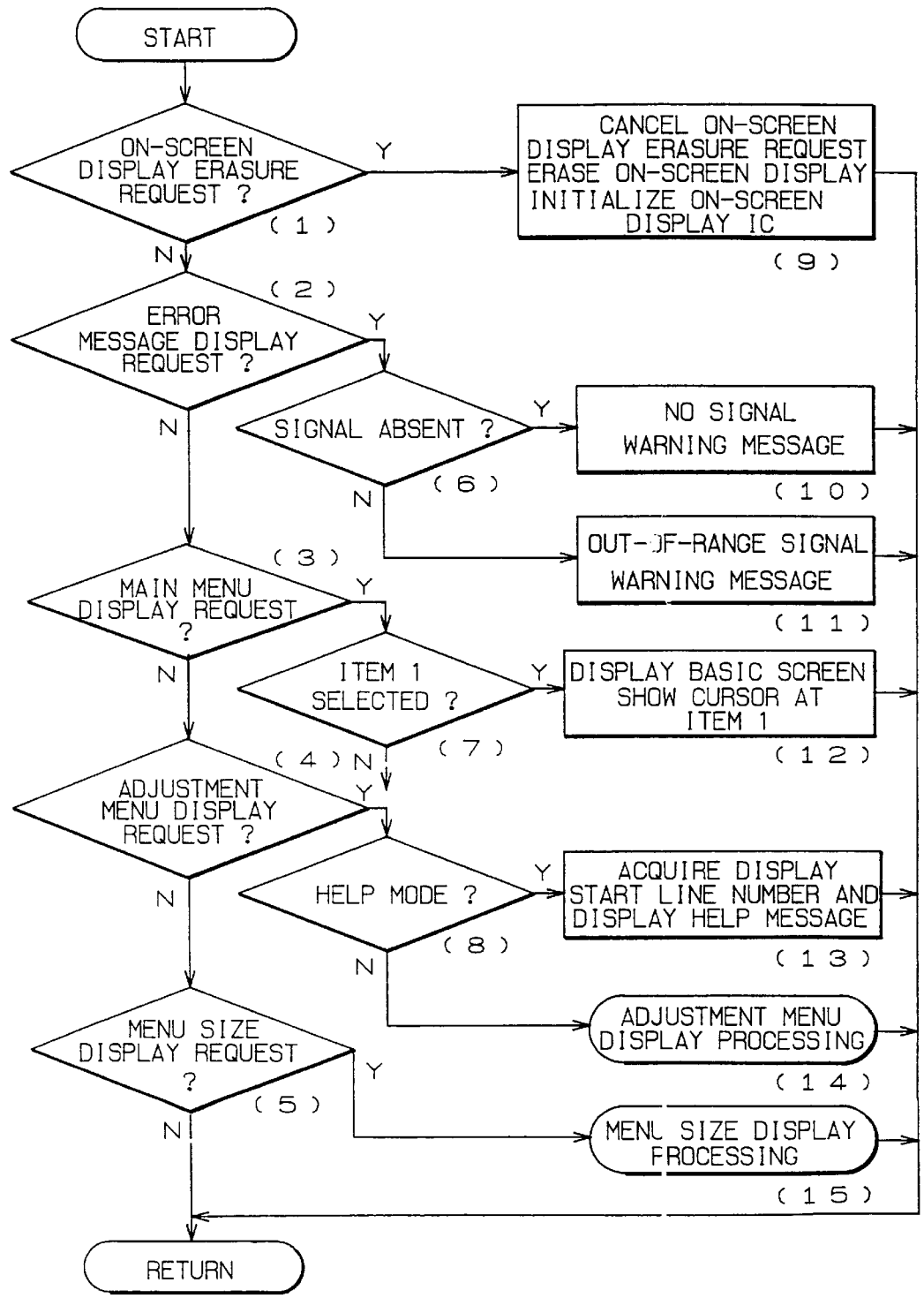
FIG. 11 is a flowchart showing the on-screen display processing.
Figure 15A:
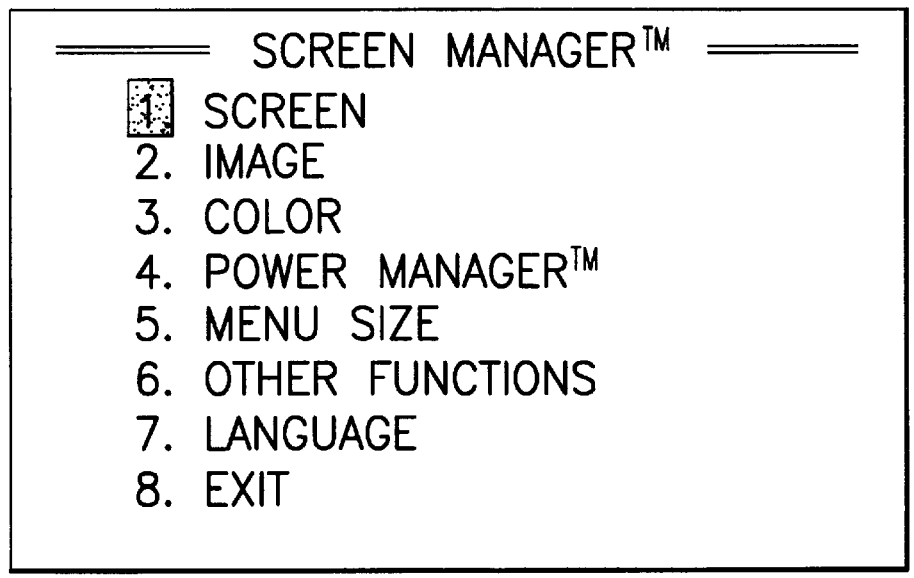
FIGS. 15(A) and 15(B) are diagrams showing examples of on-screen messages.

In the key processing routine, it is determined whether an on-screen display key is operated (step 2), and when it is determined that it is a first on-screen display key processing routine is commenced (step 6), as shown in FIG. 6. If no menu screen is displayed (step 1) when the first on-screen display key processing routine of FIG. 7 starts, a main menu is specified and a display request is transmitted to the on-screen display controller circuit 13, requesting it to show the main menu (step 7). When this display request is detected in step 7 of the main processing routine shown in FIG. 3, on-screen display processing shown in steps 3, 7 and 12 of FIG. 11 is executed and the main menu (FIG. 15(A)) is presented on the display section M1. Since option item 1 is already selected in step 7 of FIG. 7 in the above sequence, an on-screen cursor is present in item 1 (steps 7 and 12 of FIG. 11) and the system is set to a select mode.

Figure 4A:
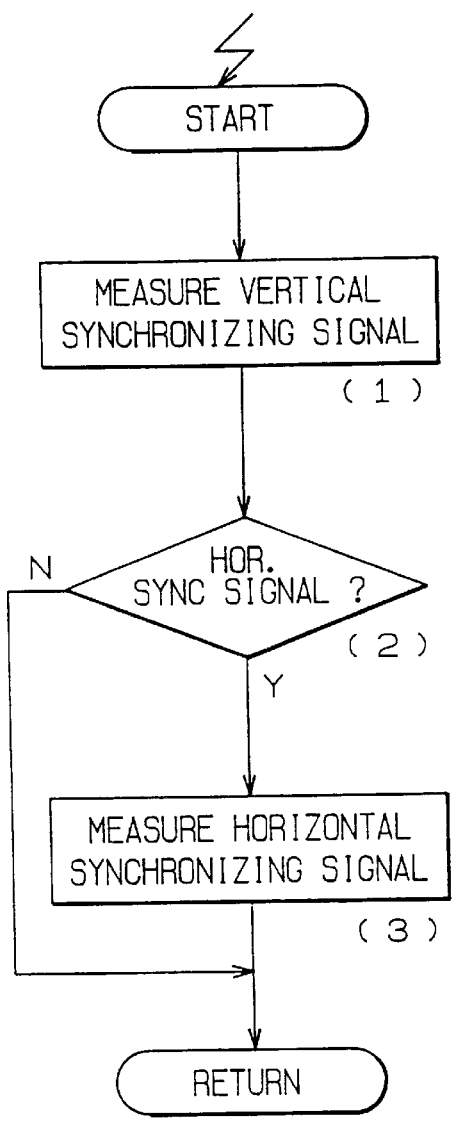
FIGS. 4(A) and 4(B) are flowcharts showing the interrupt processing.
Figure 4B:
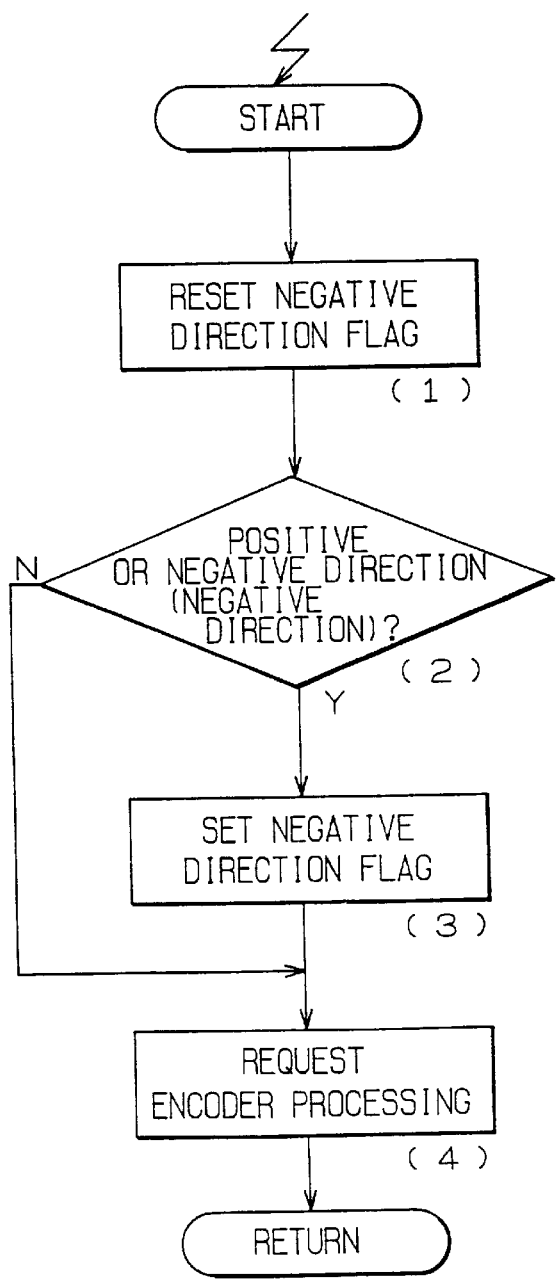
Figure 9:
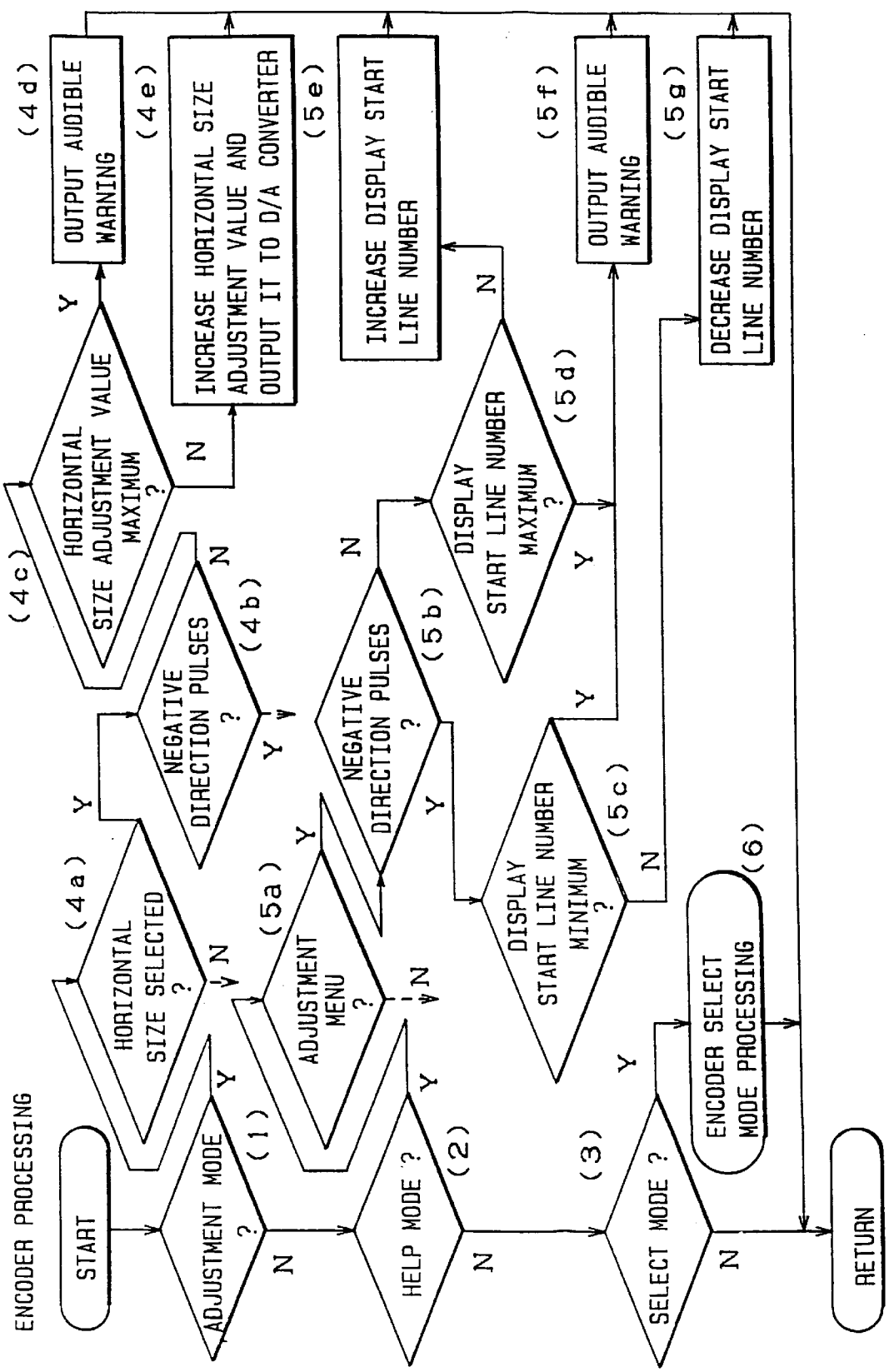
FIG. 9 is a flowchart showing the encoder processing.

If the rotary encoder 14a is rotated clockwise at this time, for example, an output of the rotary encoder 14a initiates an encoder input interrupt routine shown in FIG. 4(B). The microprocessor 11 recognizes that the rotary encoder 14a has been rotated in its negative-going direction in step 2 of FIG. 4(B), sets a negative direction flag (step 3) and requests the execution of encoder processing (step 4). The main processing routine of FIG. 3 checks for the presence of an input from the rotary encoder 14a (step 6) and runs an encoder processing routine (step 12) when there exists an input from the rotary encoder 14a. The encoder processing routine is shown in FIG. 9.

In the encoder processing, it is verified whether the select mode is currently selected (step 3), and then the encoder select mode processing is executed (step 6), where the operation flow proceeds to an encoder select mode processing routine shown in FIG. 10. In the encoder select mode processing, any desired option item presented on the main menu (step 1) can be selected in accordance with the turning direction and the amount of rotation of the rotary encoder 14a (steps 4a through 4d).

Figure 7:
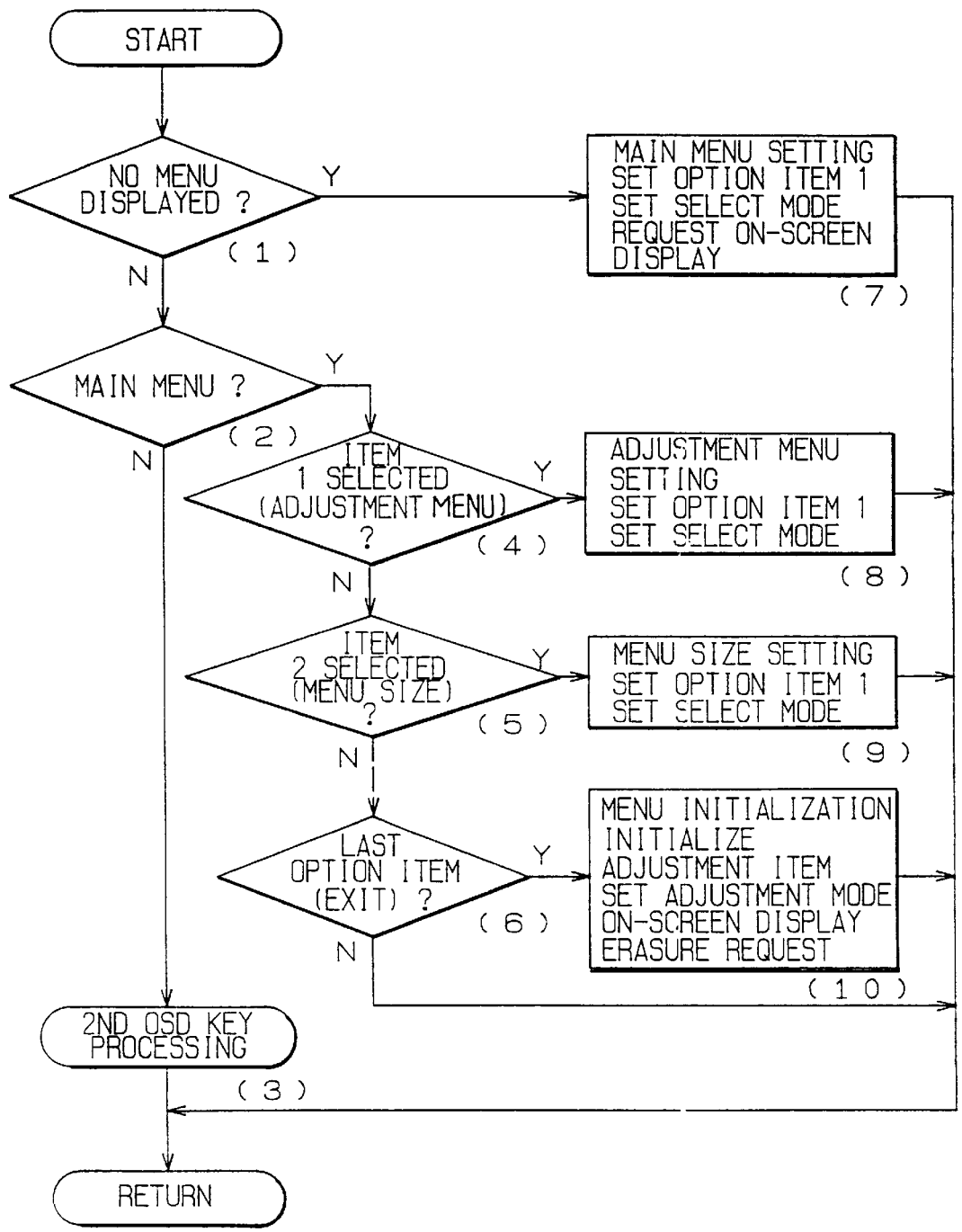
FIG. 7 is a flowchart showing the first on-screen display key processing.

As an example, when the operator selects option item 1 on the main menu and presses the operating switch SWa, the first on-screen display key processing routine shown in FIG. 7 begins by way of steps 5 and 11 of FIG. 3 and steps 2 and 6 of FIG. 6 as previously described. Then, the operation flow proceeds to steps 1, 2 and 4 of FIG. 7, allowing settings on an adjustment menu (step 8). Next, the operation flow proceeds to steps 7 and 13 of FIG. 3, and the on-screen display processing routine (FIG. 11) is commenced. In FIG. 11, the operation flow proceeds to steps 4 and 8, where an adjustment menu display processing routine is commenced (step 14).

Figure 12:
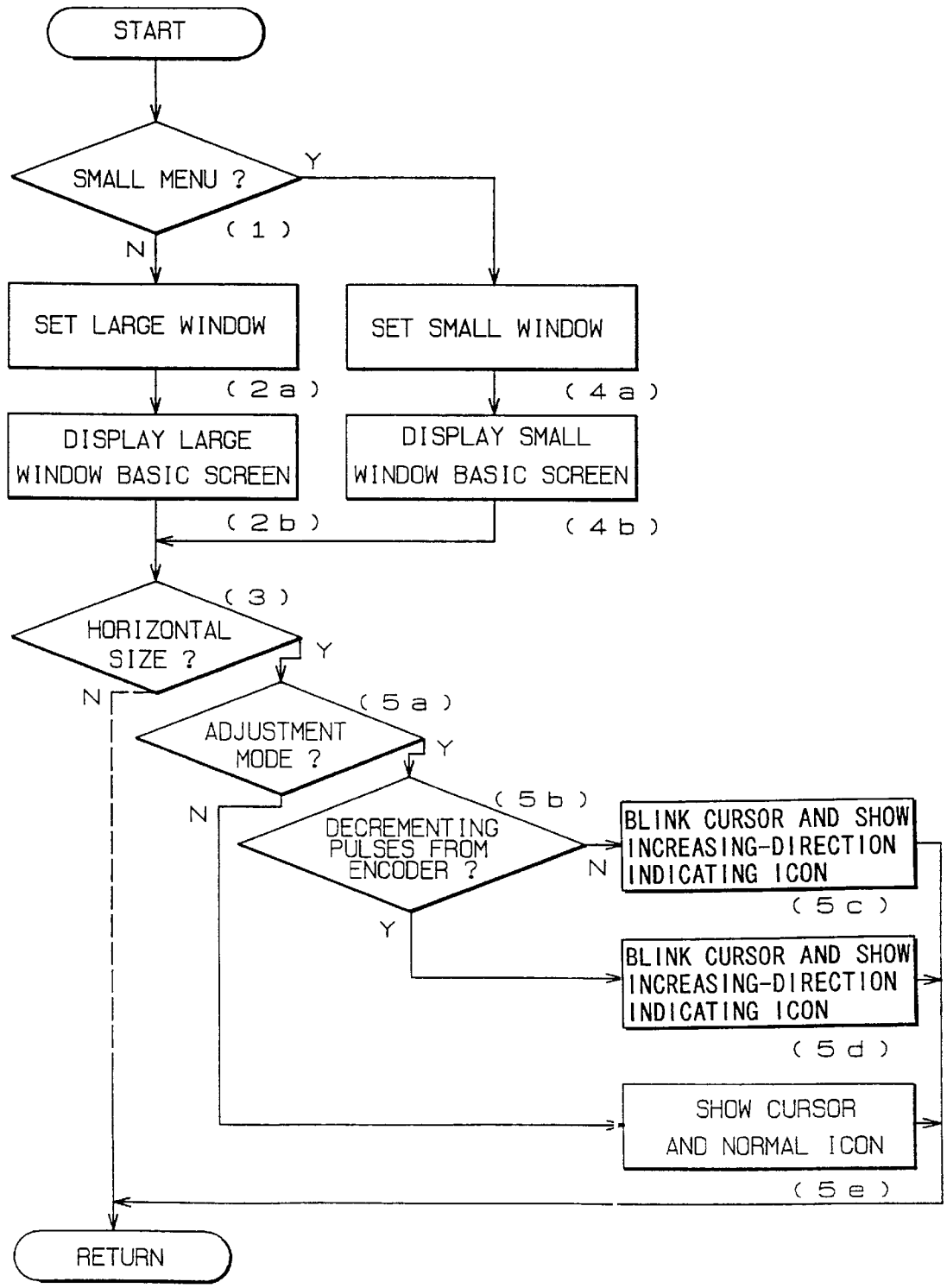
FIG. 12 is a flowchart showing the adjustment menu display processing.

As shown in FIG. 12, the adjustment menu display processing routine determines whether a small menu is specified (step 1). When the small menu is not specified, the routine selects a large window having the same size as the main menu, and presents the adjustment menu (FIG. 15(B)) on the screen of the display section M1 (step 2b).

Since option item 1 is selected in step 8 of FIG. 7 in the above sequence, an on-screen cursor is present on a symbol for picture brightness on the adjustment menu.

If the rotary encoder 14a is rotated in this condition, the encoder input interrupt routine, shown in FIG. 4(B) and steps 6 and 12 of the main processing routine shown in FIG. 3, are executed to run the encoder processing routine, and steps 3 and 6 of FIG. 9 are executed to run the encoder select mode processing routine (FIG. 10) in exactly the same manner as previously described. The encoder select mode processing routine allows a choice of option items on the adjustment menu in accordance with the turning direction and the amount of rotation of the rotary encoder 14a (steps 5a through 5d) since the adjustment menu is selected in the routine at this time (step 2 of FIG. 10).

Figure 15B:
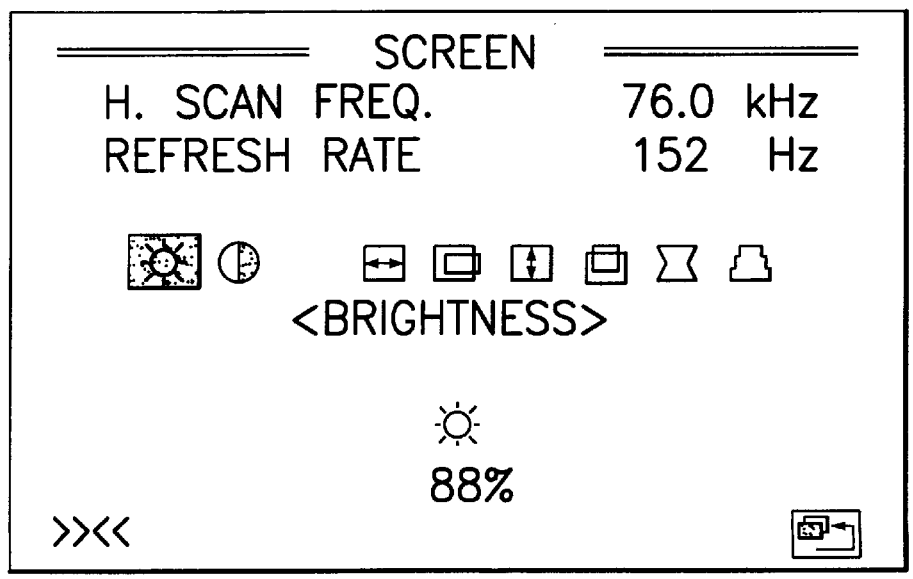
Figure 16A:
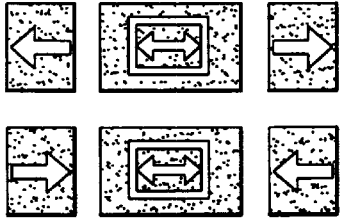
FIGS. 16(A) to 16(F) are diagrams showing examples of on-screen messages.
Figure 16B:
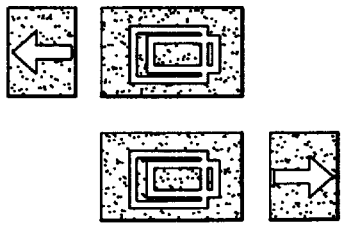
Figure 16C:
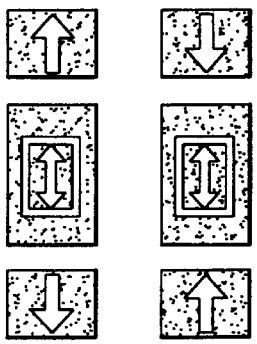
Figure 16D:
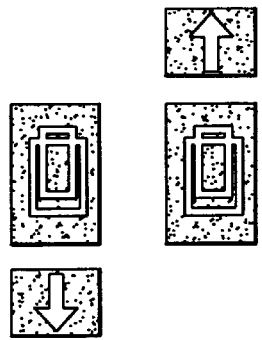
Figure 16E:
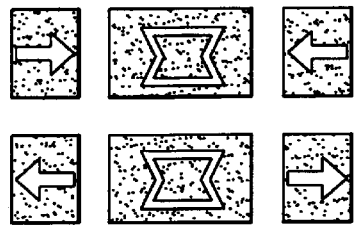
Figure 16F:
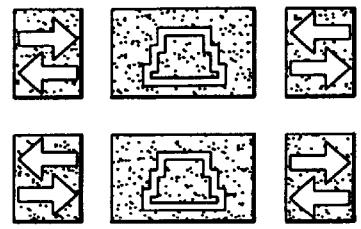

Adjustment items selectable on the adjustment menu screen shown in FIG. 15(B) are, from left to right, picture brightness, contrast, horizontal size, horizontal position, vertical size, vertical position, side-pincushion distortion and trapezoidal distortion. A selected adjustment item can be identified as the cursor moves to its corresponding symbol. In addition, a normal icon, which shows the same symbol representing the selected adjustment item, is displayed at the lower center of the adjustment menu screen (step 5e shown in FIG. 12).

Figure 8:
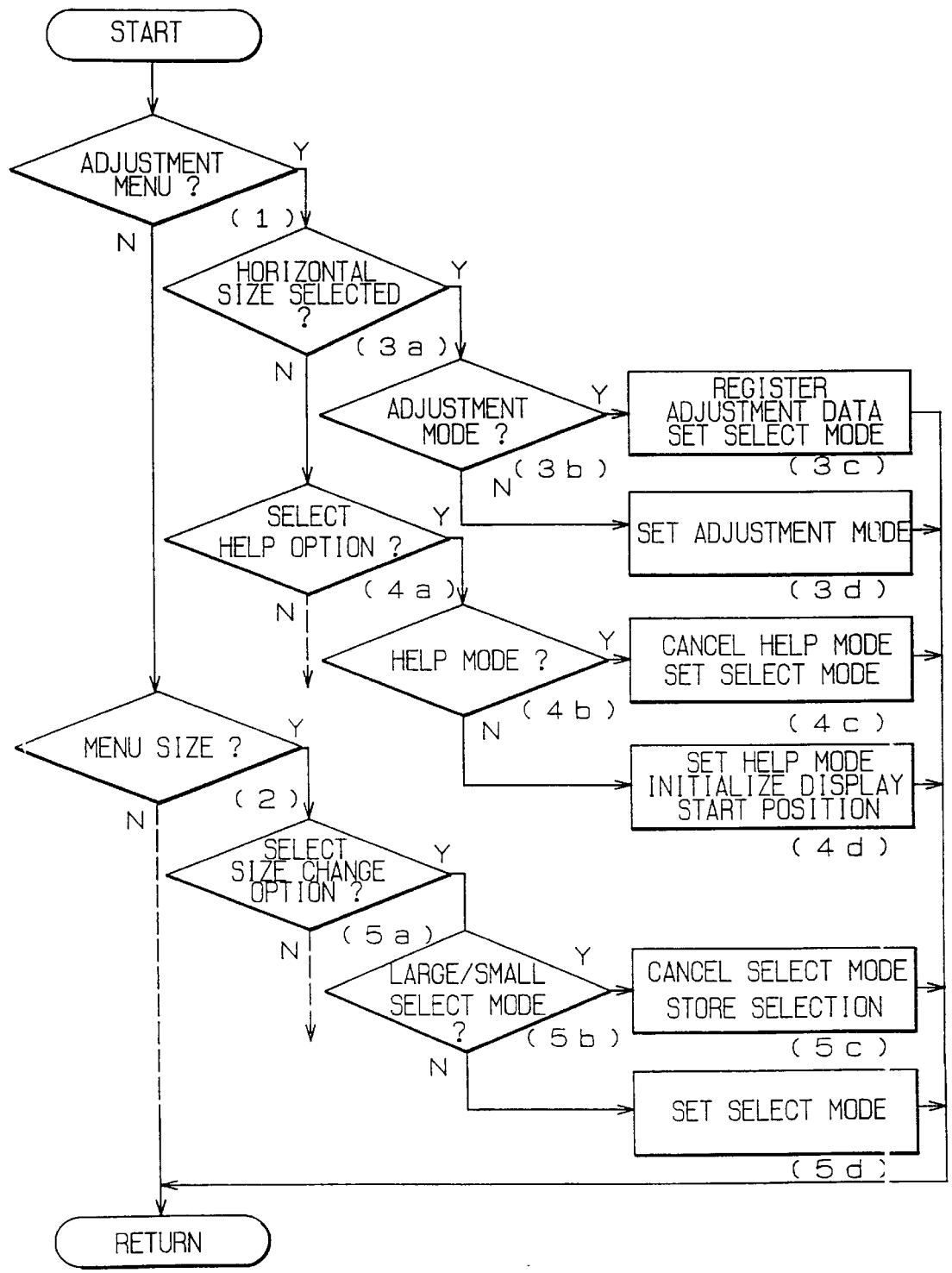
FIG. 8 is a flowchart showing the second on-screen display key processing.

If the operator selects "horizontal size" as the adjustment item and presses the operating switch SWa, the first on-screen display key processing routine shown in FIG. 7 begins by way of steps 5 and 11 of FIG. 3 and steps 2 and 6 of FIG. 6. Then, the operation flow proceeds to steps 1 and 2 of FIG. 7 and a second on-screen display key processing routine is commenced (step 3). As shown in FIG. 8, when the adjustment menu is displayed (step 1), the second on-screen display key processing routine verifies whether "horizontal size" has been selected (step 3a) and switches the whole system from the select mode to adjustment mode (steps 3bthrough 3d).

If the rotary encoder 14a is further rotated clockwise or counterclockwise, the encoder processing routine (FIG. 9) is commenced. A horizontal size adjustment value is increased or decreased in accordance with the turning direction and the amount of rotation of the rotary encoder 14a and the result is output to the D/A converter 12 (steps 1 and 4a through 4e). This causes the horizontal size of the crosshatch pattern, presented on the display section M1 for adjustment purposes, to vary continuously so that the horizontal size of the video monitor M can be easily adjusted to accomplish an optimum operating parameter setting.

The on-screen display processing routine (FIG. 11) executes its steps 4, 8 and 14 to run the adjustment menu display processing routine. The adjustment menu display processing routine (FIG. 12) can cause a cursor, denoting the "horizontal size", to blink and indicate whether the adjustment value is being increased or decreased with one of direction indicating icons while the rotary encoder 14a is rotated (steps 3 and 5a through 5d shown in FIG. 12). The direction indicating icons refer to a pair of arrow marks which are displayed on the left and right sides of a normal icon showing the symbol for the horizontal size. The direction indicating icons with outward arrows indicate that the adjustment value is being increased while those with inward arrows indicate that the adjustment value is being decreased.

FIGS. 16(A) to 16(F) show not only the normal icon and direction indicating icons for the horizontal size adjustment but also those for the other adjustment items.

When the above-described adjustment of the horizontal size has been completed, the operator presses the operating switch SWa. As a result, the key processing (FIG. 6) and first on-screen display key processing (FIG. 7) are executed and the second on-screen display key processing is commenced (steps 1 through 3 shown in FIG. 7). After executing steps 1, 3a and 3b shown in FIG. 7, the second on-screen display key processing (FIG. 8) stores the adjustment value for the horizontal size in the nonvolatile memory. Then, the whole system is set to the select mode (step 3c).

Thereafter, the other adjustment items on the adjustment menu are successively selected by operating the rotary encoder 14a and operating switch SWa in a similar way and the individual items are adjusted one after another until their adjustments are completed. When a "return" symbol shown at the lower-right corner of the adjustment menu screen is selected and the operating switch SWa is pressed, the on-screen display returns to the main menu, making it possible to select another adjustment menu.

The microprocessor 11 allows the operator to directly select a specific adjustment item by pressing a corresponding operating switch SWb provided on the operator input unit 14 without going through the main menu and adjustment menu. For example, if the operating switch SWb corresponding to the adjustment item "horizontal size" is pressed, the key processing routine of FIG. 6 recognizes that a horizontal size direct key has been pressed (step 1 of FIG. 6), sets the whole system to the adjustment mode of horizontal size direct mode (steps 3 and 4a through 4e) and outputs an on-screen display request (step 4f). At this point, it is possible to adjust the horizontal size by operating the rotary encoder 14a. The aforementioned horizontal size direct mode may be canceled by re-pressing the operating switch SWb corresponding to the "horizontal size" (steps 1, 3 and 5a through 5f). Preferably, the individual operating switches SWb correspond to such adjustment items as picture brightness, horizontal position, vertical size, vertical position, color temperature level, and so on in addition to horizontal size, since these adjustment items need to be adjusted relatively frequently.

The microprocessor 11 may have a help message display function. Help messages refer to guidance messages explaining technical details or adjustment procedures of individual adjustment items, for instance. Preferably, such guidance messages are prepared for those adjustment items which are accessed less frequently.

The help message display function can be activated by choosing a "help" option on a particular adjustment menu containing less often accessed adjustment items (step 4a shown in FIG. 8). Since the whole system is set to the "help" mode in this case (step 4b to 4d), the on-screen display processing routine (FIG. 11) can present a specific number of lines of a help message from its starting line on the display section M1 (steps 4, 8 and 13). At this time, the encoder processing routine (FIG. 9) makes it possible to freely scroll the displayed help message in accordance with the turning direction and the amount of rotation of the rotary encoder 14a (steps 2 and 5a through 5g).

In addition, the microprocessor 11 makes the adjustment operation even easier by reducing the size of the adjustment menu so that an image used for adjustment, such as the crosshatch pattern, can be seen as large as possible. In other words, the microprocessor 11 has a display size altering function for adjusting the size of on-screen messages.

Figure 13:
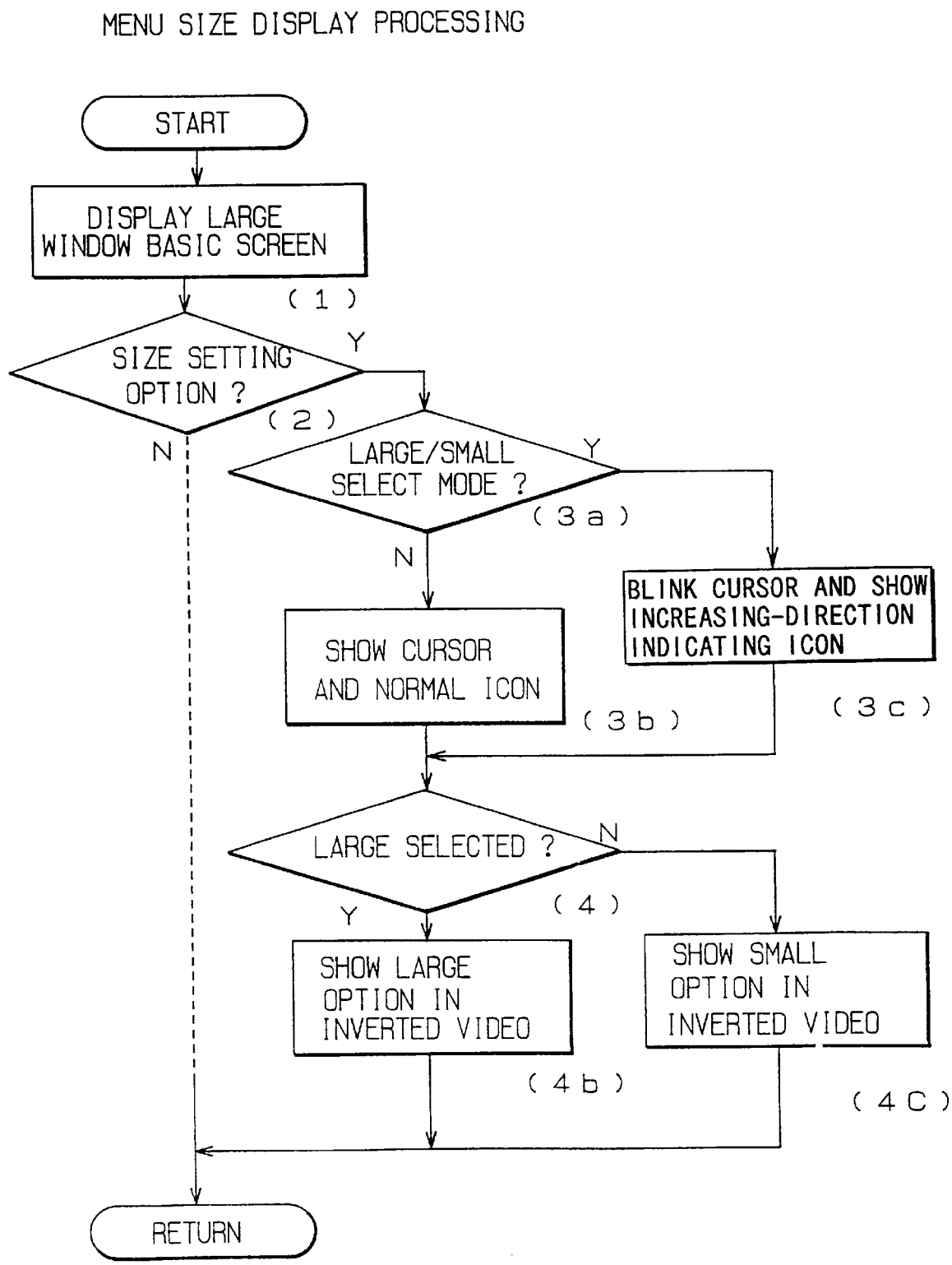
FIG. 13 is a flowchart showing the menu size display processing.

If the operator selects a "menu size" option on the main menu and presses the operating switch SWa, for instance, the first on-screen display key processing routine (FIG. 7) is commenced by way of the key processing routine. When the "menu size" option is selected on the main menu (steps 2, 4 and 5), the first on-screen display key processing routine allows menu size setting (step 9). As a result, the on-screen display processing routine (FIG. 11) initiates a menu size display processing routine (steps 5 and 15). The menu size display processing routine (FIG. 13) presents a menu size select menu (FIG. 17) on the screen (step 1 shown in FIG. 13).

Figure 17:
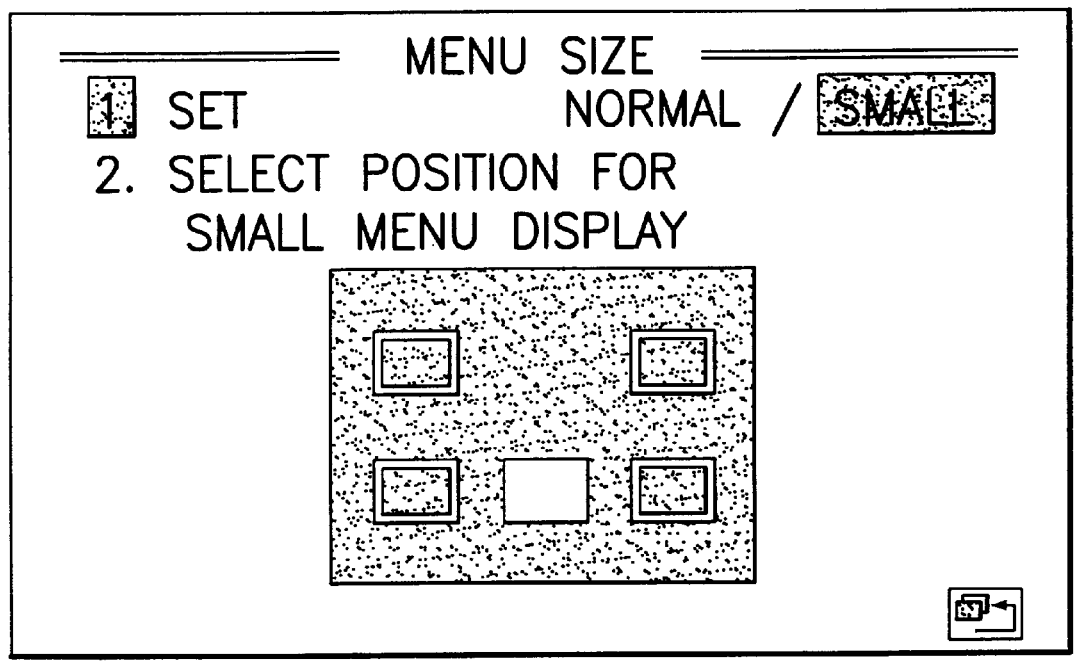
FIG. 17 is a diagram showing an example of an on-screen message.

If the operator selects "small menu" by turning the rotary encoder 14a (steps 3 and 6a through 6c shown in FIG. 10) and then pressing the operating switch SWa to memorize the selection (steps 2 and 5a through 5c shown in FIG. 8), the size of the adjustment menu is reduced (program steps 1, 4a and 4b shown in FIG. 12) so that a minimum area of the image used for adjustment such as the crosshatch pattern is hidden behind the adjustment menu. The small adjustment menu includes only normal icons showing symbols representative of individual adjustment items, combined with direction indicating the icons indicating the increasing and decreasing directions of each adjustment value. In addition, the small adjustment menu can be placed at one of five positions as appropriate, that is, upper-left, lower-left, lower-middle, lower-right and upper-right positions on the screen. This selection is enabled by choosing option item 2 on the menu size select menu (FIG. 17).

FIG. 18 is a complete listing of those adjustment items of the video monitor M which the microprocessor 11 can adjust through the D/A converter 12 in the above-described manner. "contrast" and "automatic beam limitation" (ABL) can be removed from the list of adjustment items shown in FIG. 18 if the anode current of the color CRT M1a enters the microprocessor 11 and red, green and blue gain levels are collectively controlled by software, for instance.

Furthermore, the rotary encoder 14a may be replaced by an operating switch composed of a pair of push-button switches or a single bidirectional changeover switch which can be operated to either increase or decrease the adjustment value of each operating parameter. The number of times the operating switch is operated or the length of time during which it is pressed, corresponds to the amount of rotation of the rotary encoder 14a, and whether the parameter-increasing or decreasing switch is operated, or whether the switch is operated to increase or decrease the parameter corresponds to the turning direction of the rotary encoder 14a.

FIGS. 19 to 29 are diagrams showing a video monitor adjustment system according to the second invention.

Figure 19:
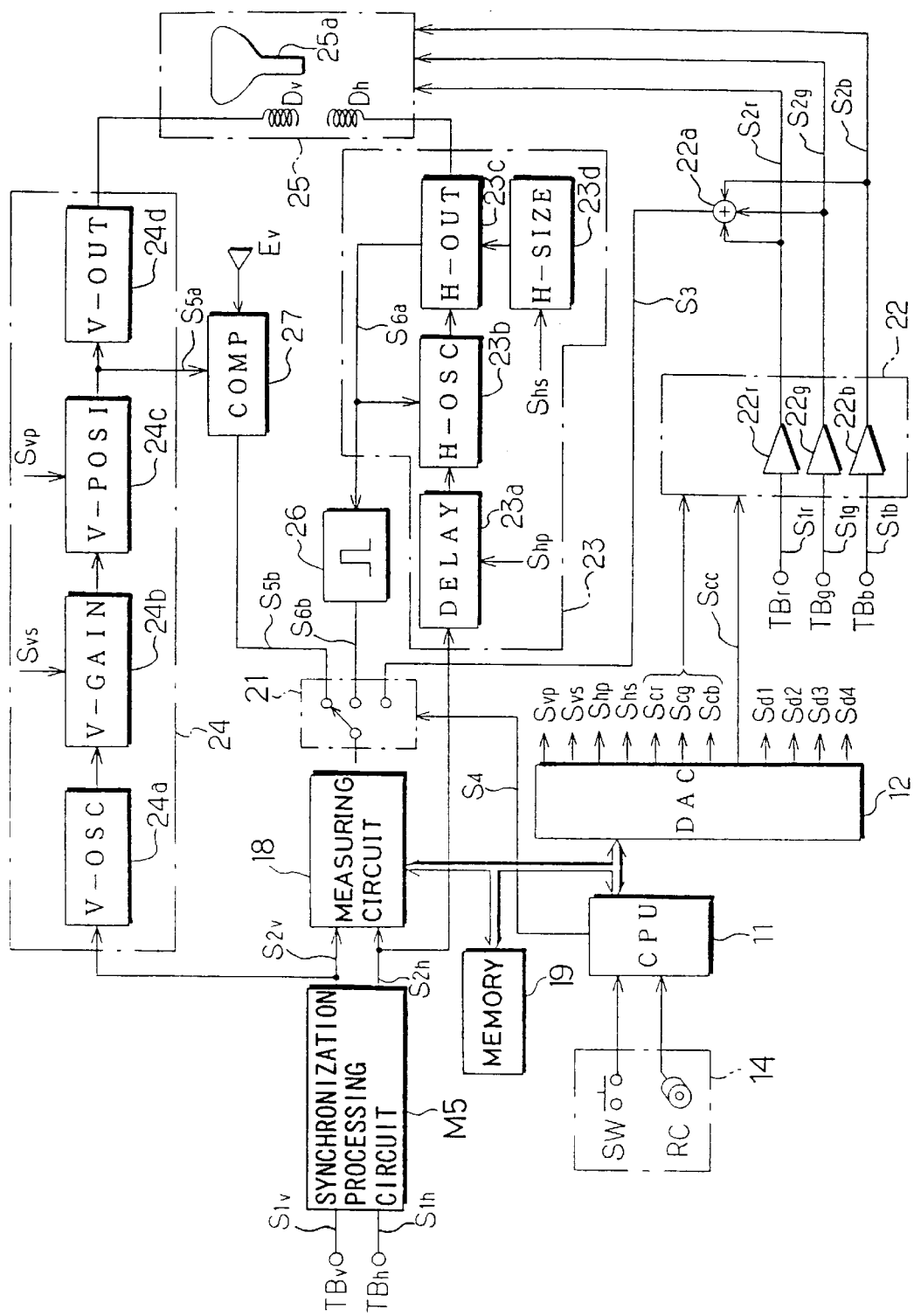
FIG. 19 is a block diagram showing a construction according to the second invention.

Referring to FIG. 19, the video monitor adjustment system comprises a microprocessor 11, a D/A converter 12 and a measuring circuit 18 and is integrally combined with a video monitor which incorporates a synchronization processing circuit M5, a video amplifier 22, a horizontal deflection circuit 23, a vertical deflection circuit 24 and a display section 25. The D/A converter 12 and the measuring circuit 18 are connected, together with a memory 19, to the microprocessor 11 via a bidirectional bus. Also connected to the microprocessor 11 is an operator input unit 14 provided with an operating switch SW and a manually operated rotary encoder RC.

A vertical synchronizing signal S1v and a horizontal synchronizing signal S1h of an externally input video signal are input to the synchronization processing circuit M5 via terminals TBv and TBh, respectively. Further, video signals S1r, S1g and S1b for individual color components of the input video signal are fed into the video amplifier 22 via terminals TBr, TBg and TBb, respectively. The video signals S1r, S1g and S1b are delivered to a CRT 25a of the display section 25 through respective amplifiers 22r, 22g and 22b, as separate color video signals S2r, S2g and S2b. The video signals S1r, S1g and S1b are also combined into a video signal S3 by a mixer 22a, and the signal S3 is input to the measuring circuit 18 via a first fixed contact of a changeover switch 21. Also input to the measuring circuit 18 are a vertical synchronizing signal S2v and a horizontal synchronizing signal S2h which are output from the synchronization processing circuit M5. The changeover switch 21 can be controlled by a control signal S4 fed from the microprocessor 11.

The vertical synchronizing signal S2v branches out and is input to a vertical oscillating circuit 24a in the vertical deflection circuit 24. The vertical deflection circuit 24 comprises the vertical oscillating circuit 24a, a vertical gain adjusting circuit 24b, a vertical position adjusting circuit 24c and a vertical output circuit 24d which are connected in series, and an output from the vertical output circuit 24d is connected to a vertical deflection coil Dv of the display section 25. An output from the vertical position adjusting circuit 24c branches out and is also input to a comparator 27 as a vertical deflection voltage S5a, and an output from the comparator 27 is connected to a second fixed contact of the changeover switch 21 as a vertical timing signal S5b. A reference voltage Ev also enters to the comparator 27.

The horizontal synchronizing signal S2h which is output from the synchronization processing circuit M5 branches out and is input to a delay circuit 23a in the horizontal deflection circuit 23. The horizontal deflection circuit 23 comprises the delay circuit 23a, a horizontal oscillating circuit 23b and a horizontal output circuit 23c which are connected in series, and an output from the horizontal output circuit 23c is connected to a horizontal deflection coil Dh of the display section 25. A horizontal deflection pulse S6a which is also output from the horizontal output circuit 23c branches out and is input individually to the horizontal oscillating circuit 23b and a waveform shaping circuit 26. A horizontal timing signal S6b which is output from the waveform shaping circuit 26 is connected to a third fixed contact of the changeover switch 21. In addition, a horizontal size adjusting circuit 23d is connected to the horizontal output circuit 23c.

The D/A converter 12 is a multichannel-type digital-to-analog converter which can output a vertical position setting signal Svp, a vertical size setting signal Svs, a horizontal position setting signal Shp, a horizontal size setting signal Shs, gain setting signals Scr, Scg and Scb for the individual colors, a contrast setting signal Scc, distortion correction setting signals Sd1, Sd2 and so forth.

The vertical position setting signal Svp and vertical size setting signal Svs are input to the vertical position adjusting circuit 24c and vertical gain adjusting circuit 24b in the vertical deflection circuit 24, respectively, while the horizontal position setting signal Shp and horizontal size setting signal Shs are input to the delay circuit 23a and horizontal size adjusting circuit 23d in the horizontal deflection circuit 23, respectively.

The gain setting signals Scr, Scg and Scb for the individual colors and the contrast setting signal Scc are input to the video amplifier 22. Further, the distortion correction setting signals Sd1, Sd2, and so forth are input to an unillustrated distortion correcting circuit or the horizontal output circuit 23c, both contained in the horizontal deflection circuit 23, depending on which types of distortion are to be corrected by the individual signals.

Figure 20:
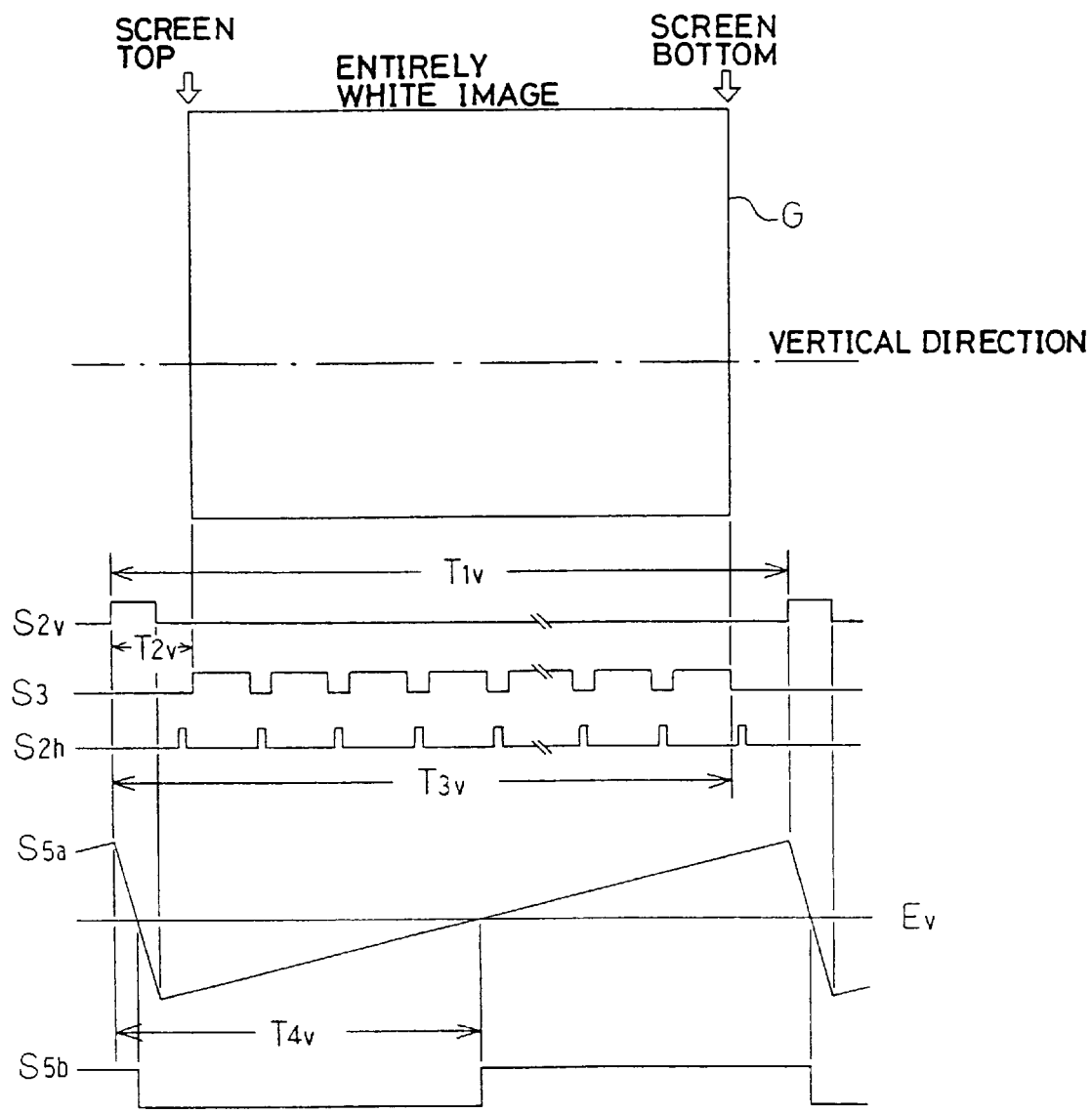
FIG. 20 is a time chart illustrating the operation of FIG. 19.

The video monitor presents a color image G on the CRT 25a of the display section 25, based on the input video signal containing the vertical synchronizing signal S1v and horizontal synchronizing signal S1h which are input through the terminals TBv and TBh and the video signals S1r, S1g and S1b for the individual colors which are input through the terminals TBr, TBg and TBb (FIG. 20).

If the video signals S1r, S1g and S1b are for presenting an entirely white image, the vertical synchronizing signal S2v and horizontal synchronizing signal S2h which are output from the synchronization processing circuit M5 and the video signal S3 from the mixer 22a are as illustrated in FIG. 20, and the amplitude of the vertical deflection voltage S5a produced in the vertical deflection circuit 24 corresponds to the vertical size of the on-screen image G while its DC level corresponds to the vertical position of the on-screen image G.

Thus, the comparator 27 can output the vertical timing signal S5b which corresponds to the vertical position of the on-screen image G, based on a comparison between the vertical deflection voltage S5a and reference voltage Ev. More specifically, it is possible to make a period of time T4v (hereinafter referred to as vertical timing period), measured from the vertical synchronizing signal S2v to a leading edge of the vertical timing signal S5b, correspond to the vertical position of the on-screen image G by properly setting the reference voltage Ev. FIG. 20 shows vertical scanning period T1v, vertical display start time T2v and vertical display end time T3v.

Figure 21A:
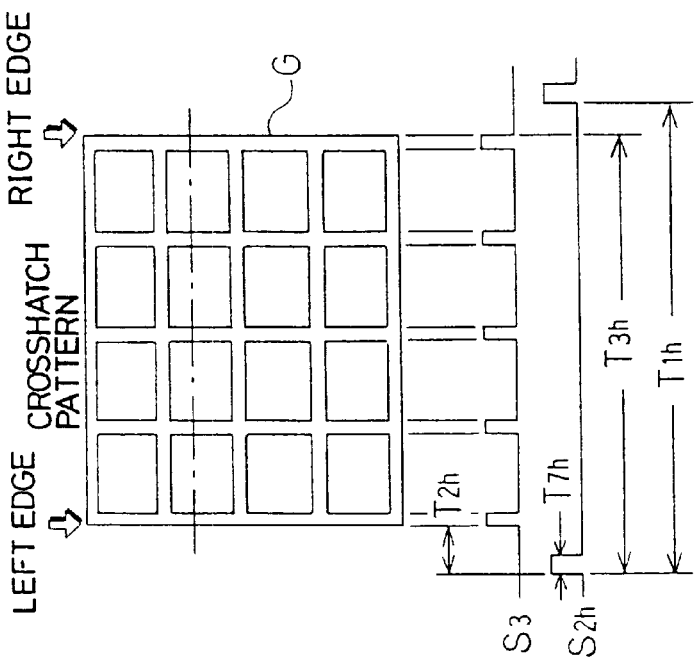
FIGS. 21(A) and 21(B) are also time charts illustrating the operation of FIG. 19.

The horizontal deflection pulse S6a which is output from the horizontal deflection circuit 23 is delayed from the horizontal synchronizing signal S2h by a delay time T4h due to, for example, the delay circuit 23a, or a stray capacitance contained in the horizontal deflection circuit 23 (FIG. 21(A)). The horizontal output circuit 23c generates a sawtooth-shaped horizontal deflection current, synchronized with such horizontal deflection pulse S6a. The amplitude of the horizontal deflection current is determined by a source voltage supplied to the horizontal output circuit 23c that is adjusted through the horizontal size adjusting circuit 23d, and the horizontal size of the on-screen image G is determined by the amplitude of the horizontal deflection current. The waveform shaping circuit 26 can output the horizontal timing signal S6b by shaping the waveform of the horizontal deflection pulse S6a. Time T5h, measured from the horizontal synchronizing signal S2h to the middle of each pulse interval of the horizontal timing signal S6b, corresponds to the horizontal position of the on-screen image G. This is because individual scanning lines constituting the on-screen image G correspond to the pulse intervals of the horizontal deflection pulse S6a and horizontal timing signal S6b.

Figure 21B:
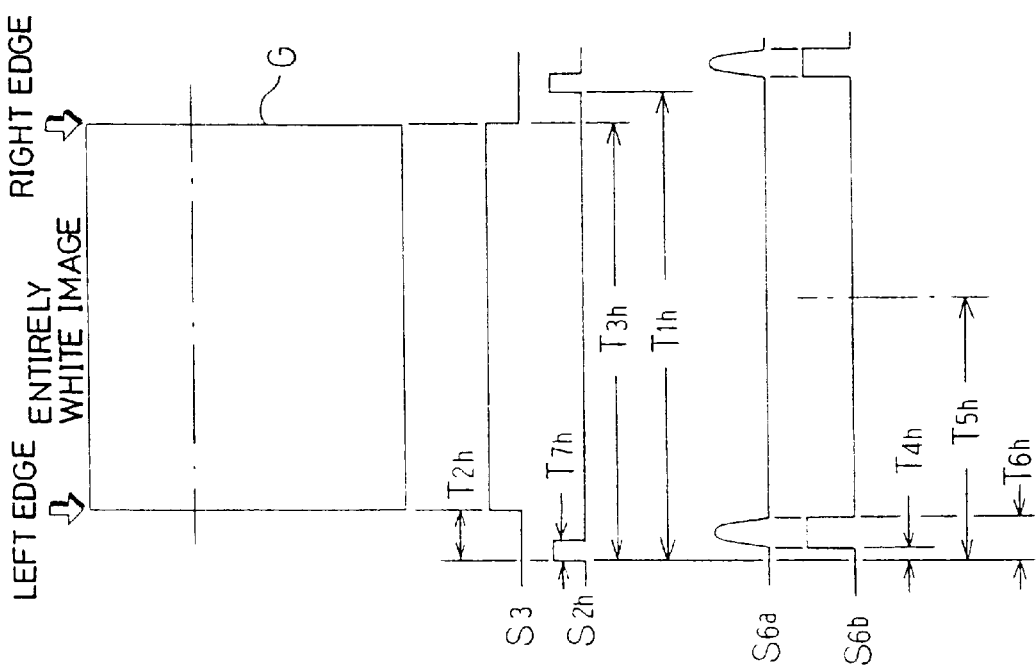

FIG. 21(B) shows the horizontal synchronizing signal S2h and typical video signal S3 which are seen when the on-screen image G is a crosshatch pattern. FIGS. 21(A) and 21(B) also show horizontal scanning period T1h, horizontal display start time T2h and horizontal display end time T3h.

Figure 22:
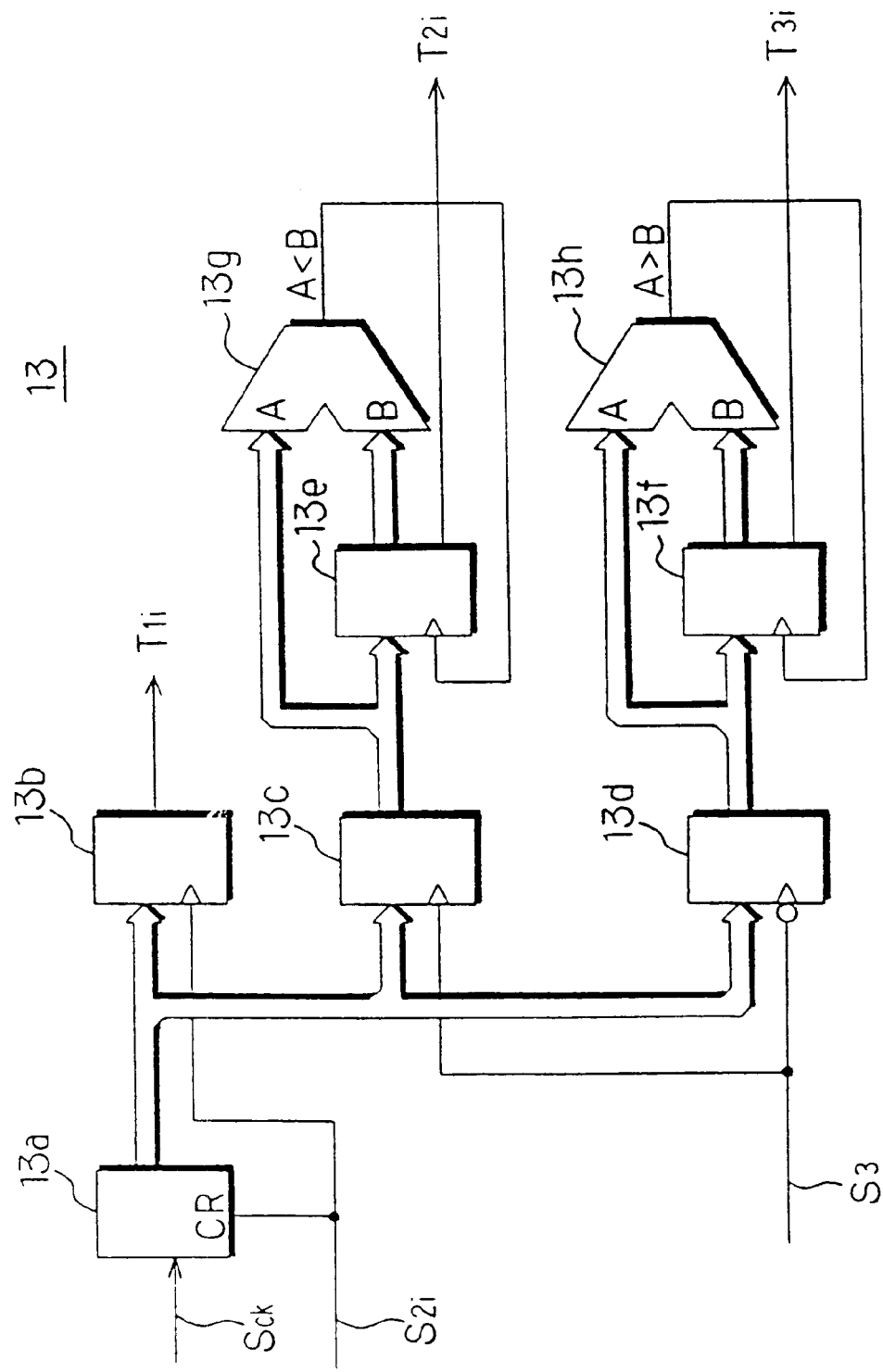
FIG. 22 is a detailed diagram of the measuring circuit shown in FIG. 19.

Referring to FIG. 22, the measuring circuit 18 basically comprises a counter 18a for counting a clock signal Sck, registers 18b, 18c and 18d for latching the data content of the counter 18a, registers 18e and 18f for transferring the data contents of the registers 18c and 18d, and comparators 18g and 18h for comparing the data contents of the registers 18c and 18e, and also those of the registers 18d and 18f.

The vertical synchronizing signal S2v or horizontal synchronizing signal S2h is selectively input to the counter 18a and register 18b as a synchronizing signal S2i (where i=v or h), and the video signal S3 is input to the registers 18c and 18d by connecting a moving contact of the changeover switch 21 to its first fixed contact, or by turning the changeover switch 21 to the mixer 22a.

When the counter 18a counts every pulse of the clock signal Sck and is reset every leading edge of the synchronizing signal S2i and the register 18b latches the data content of the counter 18a every leading edge of the synchronizing signal S2i immediately before counter 18a is reset, the data content of the register 18b indicates the vertical scanning period T1v or horizontal scanning period T1h, depending on whether the synchronizing signal S2i is the vertical synchronizing signal S2v or horizontal synchronizing signal S2h. This means that the counter 18a and register 18b can measure the vertical or horizontal scanning period T1i (where i=v or h) and output it to the microprocessor 11. The register 18c latches the data content of the counter 18a every leading edge of the video signal S3, and the comparator 18g compares the data contents of the registers 18c and 18e. If the content of the register 18c is smaller than that of the register 18e, the content of the register 18c is transferred to the register 18e. As a result, the register 18e can detect a minimum value of the vertical or horizontal display start time T2i (where i=v or h). The register 18d latches the data content of the counter 18a every trailing edge of the video signal S3. If the content of the register 18d is larger than that of the register 18f, the comparator 18h transfers the content of the register 18d to the register 18f. As a result, the register 18f can detect a maximum value of the vertical or horizontal display end time T3i (where i=v or h).

The aforementioned operation of the registers 18c and 18e, comparator 18g, registers 18d and 18f and comparator 18h is carried out every vertical scanning period of the on-screen image G. The registers 18e and 18f can output the minimum value of the display start time T2i and the maximum value of the display end time T3I, detected as described above, to the microprocessor 11 as display start time T2i and display end time T3i that represent the input video signal timing, respectively.

The measuring circuit 18 can measure the vertical timing period T4v if the counter 18a is combined with an unillustrated register and the vertical timing signal S5b is input instead of the video signal S3, and it can measure the delay time T4h if the horizontal timing signal S6b is input instead of the video signal S3. Furthermore, the measuring circuit 18 can measure time T6h (hereinafter referred to as horizontal timing period) from the horizontal synchronizing signal S2h to a trailing edge of the horizontal timing signal S6b to calculate the time T5h to the middle of each pulse interval of the horizontal timing signal S6b. The measuring circuit 18 can then output these measurement results to the microprocessor 11. The vertical timing period T4v represents the operating timing of the vertical deflection circuit 24 while the delay time T4h and horizontal timing period T6h represent the operating timing of the horizontal deflection circuit 23.

Figure 23:
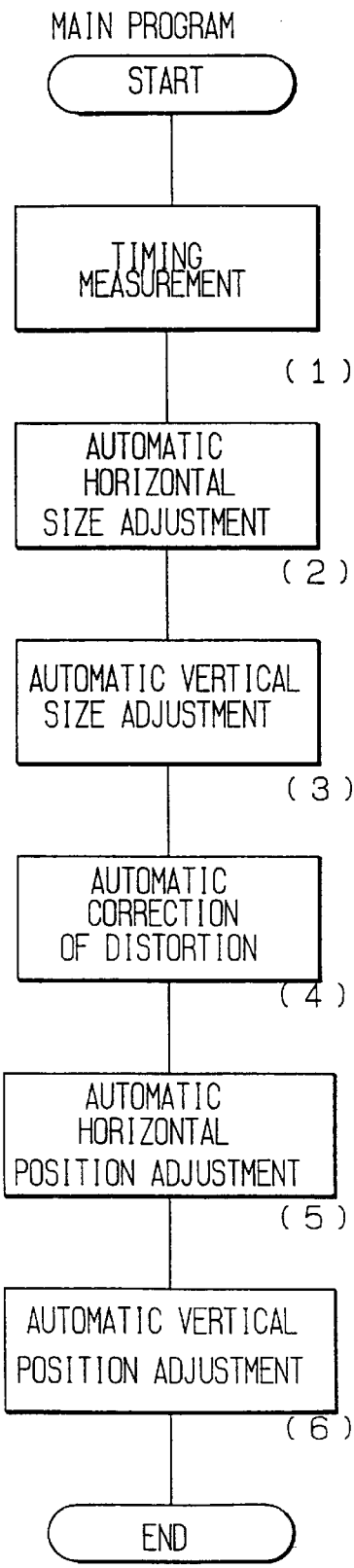
FIG. 23 is a general flowchart showing the main processing of the second invention.

The microprocessor 11 is automatically activated when the video monitor is powered on and performs a main program which is shown in FIG. 23. Specifically, the microprocessor 11 measures the timing of the externally input video signal using the measuring circuit 18 (step 1 shown in FIG. 23), automatically adjusts the horizontal and vertical sizes of the image G displayed on the CRT 25a (steps 2 and 3), automatically corrects distortions of the on-screen image G (step 4), and automatically adjusts the horizontal and vertical positions of the on-screen image G (steps 5 and 6) to complete the adjustment sequence.

Figure 24:
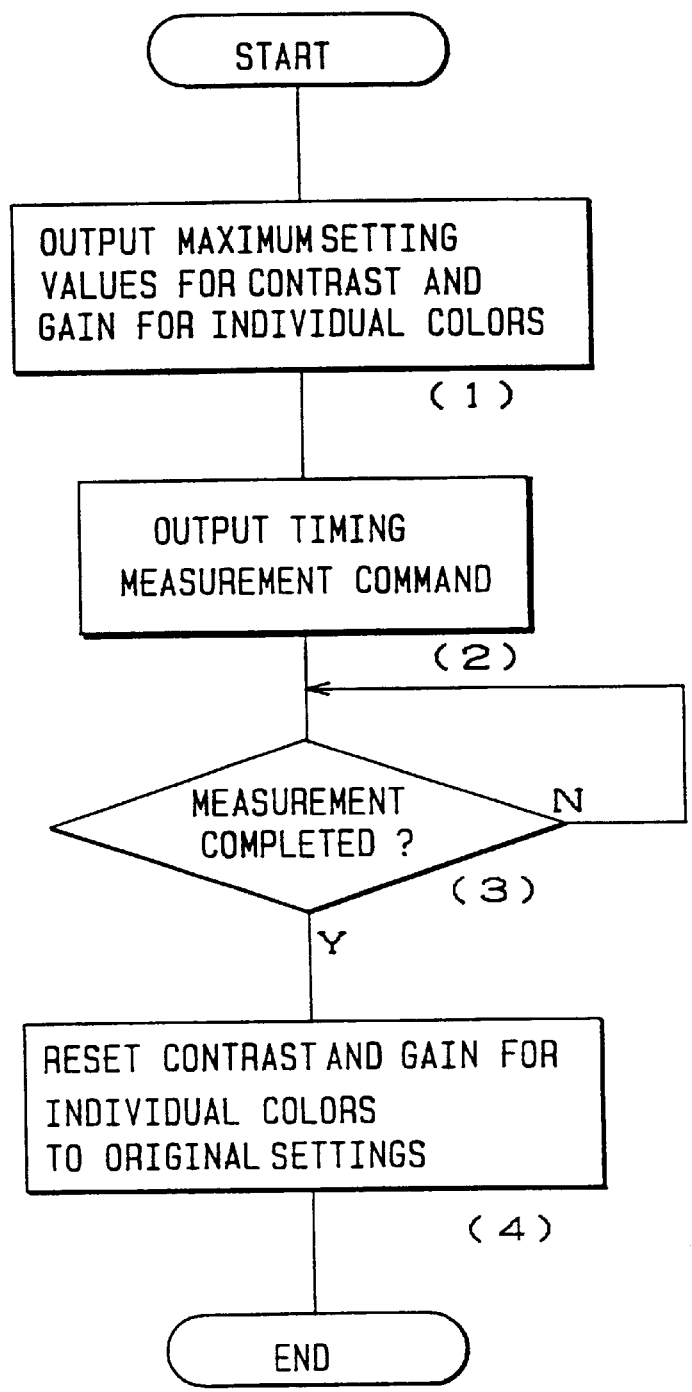
FIG. 24 is a flowchart showing the timing processing.

Input video signal timing measurement processing is executed in accordance with the flowchart shown in FIG. 24. First, the microprocessor 11 outputs maximum values of contrast setting and gain settings for the individual colors to the D/A converter 12 (step 1). Then, the D/A converter 12 outputs the corresponding contrast setting signal Scc and gain setting signals Scr, Scg and Scb for the individual colors to the video amplifier 22. Consequently, contrast and brightness of the individual colors of the on-screen image G are set to their maximum levels.

Next, the microprocessor 11 outputs a timing measurement command to the measuring circuit 18 (step 2). When timing measurement is completed (step 3), the microprocessor 11 resets the contrast and brightness of the individual colors of the on-screen image G to their original levels (step 4). When outputting the timing measurement command, the microprocessor 11 transmits a control signal S4 to turn the changeover switch 21 to the mixer 22a. Upon receiving the timing measurement command from the microprocessor 11, the measuring circuit 18 measures the vertical scanning period T1v, horizontal scanning period T1h, vertical display start time T2v, horizontal display start time T2h, vertical display end time T3v and horizontal display end time T3h, as parameters representative of the input video signal timing, and returns the measurement results to the microprocessor 11.

Subsequently, the microprocessor 11 performs automatic adjustment of the horizontal size (step 2 shown in FIG. 23; refer to FIG. 25 for details). Specifically, the microprocessor 11 calculates horizontal effective scanning ratio Rh from the following equation by using the horizontal scanning period T1h, horizontal display start time T2h and horizontal display end time T3h which are output from the measuring circuit 18 (step 1 shown in FIG. 25):

$$Rh/(T3h/T2h)$$

The microprocessor 11 then calculates a horizontal size setting value as a linear function of the effective scanning ratio Rh (step 2) and corrects the calculated horizontal size setting value by using a horizontal scanning frequency Fh=1/T1h (steps 3 and 4). Such frequency correction with the horizontal scanning frequency Fh generally means a process of adding a constant, which is proportional to the horizontal scanning frequency Fh, to the horizontal size setting value. A linearity correction by the horizontal deflection circuit 23 may be performed in addition to the frequency correction.

The microprocessor 11 outputs the horizontal size setting value thus obtained to the D/A converter 12 (step 5). The D/A converter 12 transmits the horizontal size setting signal Shs to the horizontal size adjusting circuit 23d in the horizontal deflection circuit 23 so that the horizontal size of the on-screen image G can be optimally adjusted. As an alternative, microprocessor 11 may measure a pulse-width T7h of the horizontal synchronizing signal S2h by using the measuring circuit 18 (refer to FIGS. 21(A) and 21(B)) and then calculate the effective scanning ratio Rh from the equation shown below. According to this operation, it is possible to accomplish a more accurate horizontal size adjustment, eliminating the effect of horizontal retrace time.

$$Rh=(T1h-T7h)/(T3h-T2h)$$

Figure 25:
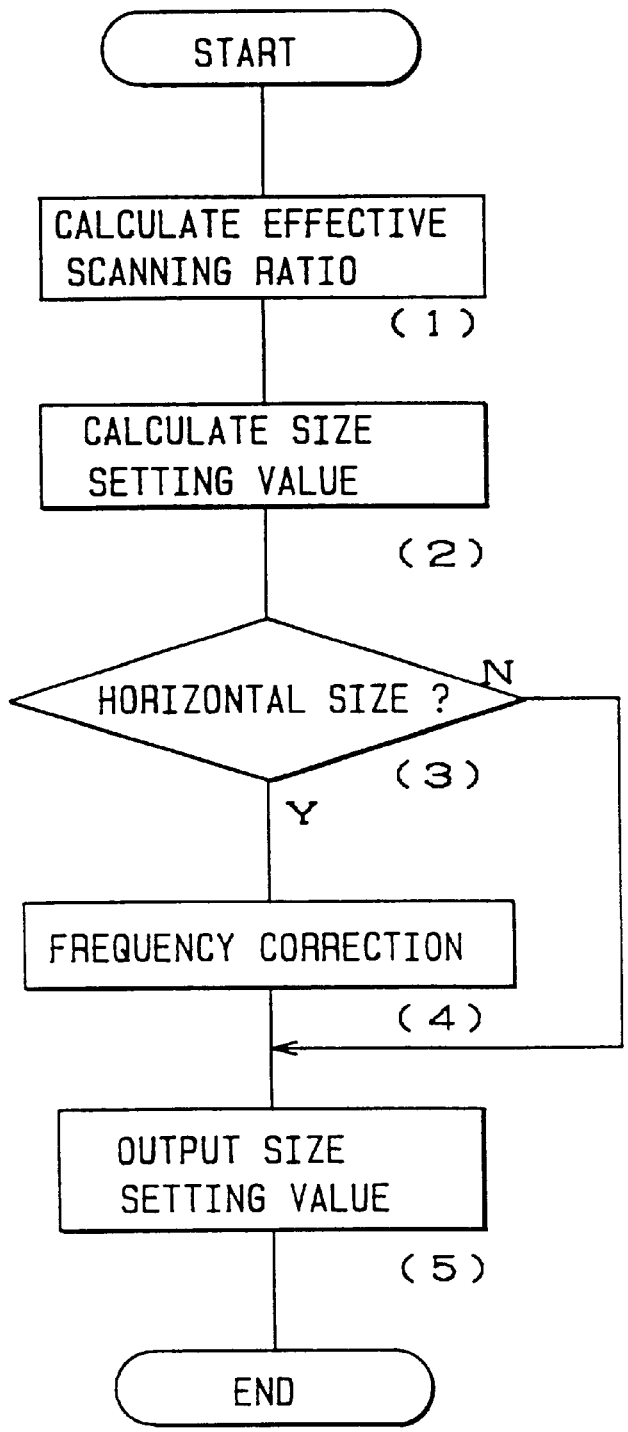
FIG. 25 is a flowchart showing the automatic size adjustment operation.

The subsequent automatic vertical size adjustment is essentially the same as the adjustment of the horizontal size (step 3 shown in FIG. 23; refer to FIG. 25 for details). In step 1 of FIG. 25, however, vertical effective scanning ratio Rv is calculated from the following equation:

$$Rv=T1v/(T3v-T2v)$$

Also, a vertical size setting value is derived as a linear function of the effective scanning ratio Rv and is directly output to the D/A converter 12 (steps 2, 3 and 5). The D/A converter 12 transmits the vertical size setting signal Svs to the vertical gain adjusting circuit 24b in the vertical deflection circuit 24 so that the vertical size of the on-screen image G can be automatically adjusted. The effect of vertical retrace time may be eliminated when calculating the effective scanning ratio Rv in a similar way that adopted for the horizontal size adjustment.

Figure 26:
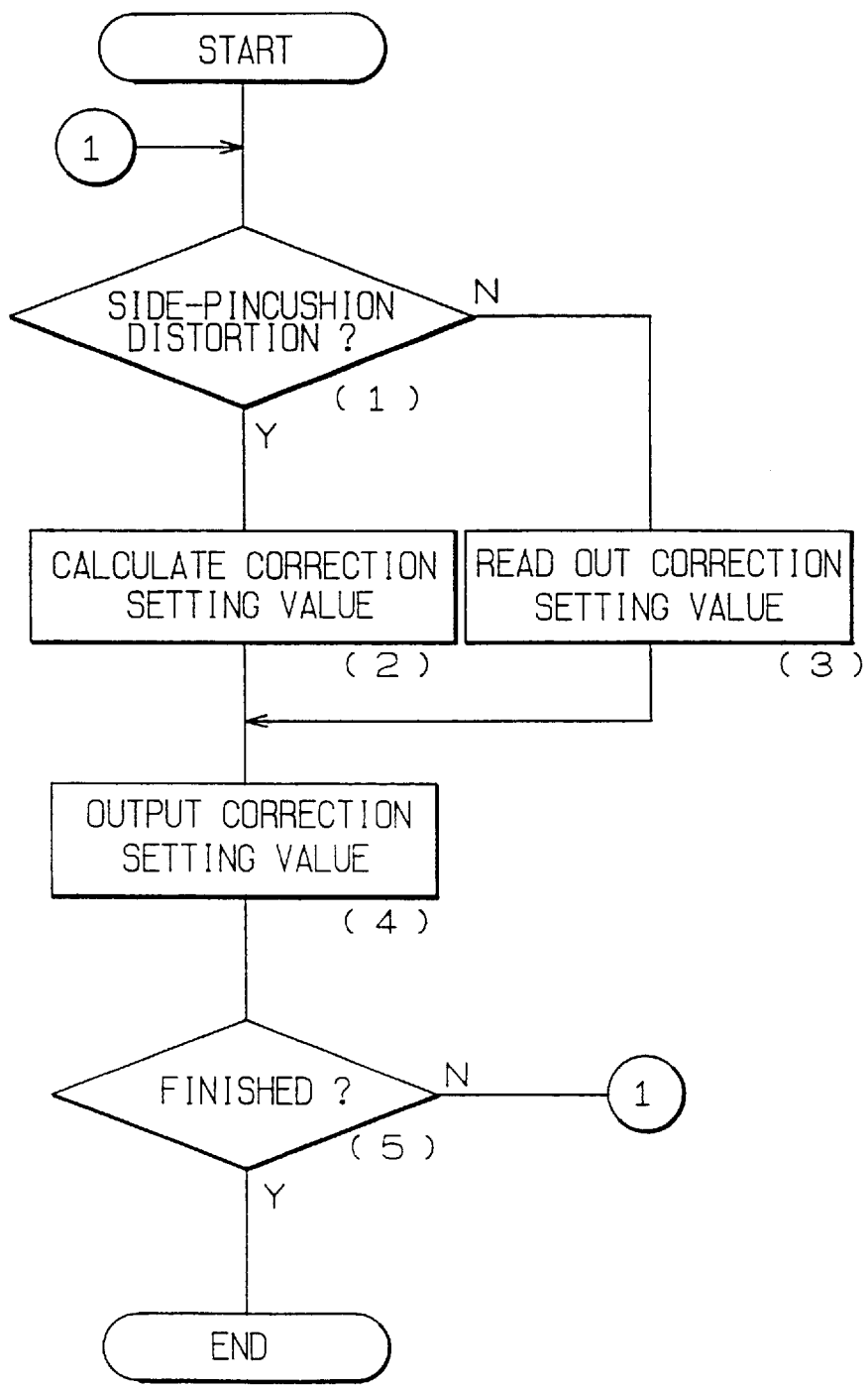
FIG. 26 is a flowchart showing the automatic correction of distortion.

Next, the microprocessor 11 performs automatic correction of distortions of the on-screen image G (step 4 shown in FIG. 23; refer to FIG. 26 for details). Types of distortions to be corrected are side-pincushion distortion, trapezoidal distortion, side-pine-balance distortion and parallelogram distortion (FIG. 27). The distortion correction setting signals Sd1, Sd2 and so forth which are output from the D/A converter 12 correspond to the individual types of distortions. A correction setting value for side-pincushion distortion (step 1 shown in FIG. 26) is derived as a linear function of the horizontal scanning frequency Fh (step 2) while already stored correction setting values are read out for other types of distortions (step 3). In either case, the correction setting value is then output to the D/A converter 12 (step 4).

The automatic distortion correction is carried out for all types of distortions to be corrected and completed upon transmitting individual setting values (step 5). The correction setting values for distortions other than the side-pincushion distortion may be also calculated in a similar way to that adopted for the side-pincushion distortion.

Figure 28:
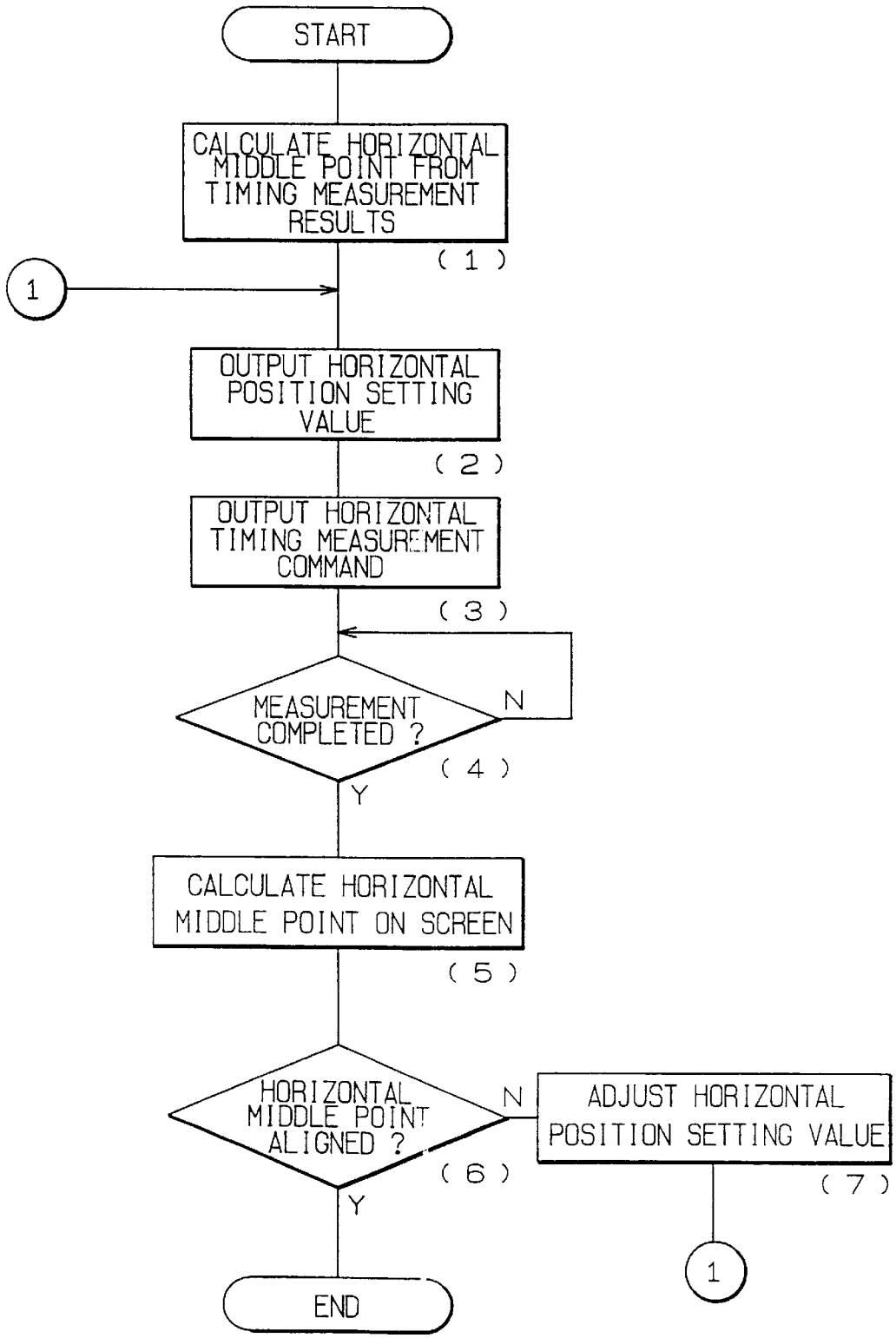
FIG. 28 is a flowchart showing the automatic horizontal position correction.

Next, the microprocessor 11 performs automatic adjustment of the horizontal position of the on-screen image G (step 5 shown in FIG. 23; refer to FIG. 28 for details). First, the microprocessor 11 calculates a theoretical horizontal middle point Mh0 of the on-screen image G, produced from the input video signal, by using the horizontal display start time T2h and horizontal display end time T3h which are output from the measuring circuit 18 (step 1 shown in FIG. 28).

$$Mh0=T2h+(T3h-T2h)/2$$

The microprocessor 11 outputs an appropriate horizontal position setting value to the D/A converter 12 (step 2), and the D/A converter 12 transmits the horizontal position setting signal Shp to the delay circuit 23a so that the horizontal position of the image G displayed on the CRT 25a is properly set.

The microprocessor 11 then sets the changeover switch 21 to the waveform shaping circuit 26 and outputs a horizontal timing measurement command to the measuring circuit 18 (step 3). Consequently, the measuring circuit 18 can receive the horizontal timing signal S6b through the changeover switch 21, measure the delay time T4h and horizontal timing period T6h of the horizontal deflection pulse S6a and horizontal timing signal S6b, and output the measurement results to the microprocessor 11. When the measurement by the measuring circuit 18 is completed (step 4), the microprocessor 11 can calculate an actual horizontal middle point Mh=T5h of the on-screen image G on the CRT 25a (step 5).

$$Mh=T5h=(T1h-(T6h-T4h))/2$$

Then, the microprocessor 11 compares the horizontal middle points Mh and Mh0 (step 6), adjusts the horizontal position setting value (step 7), and repeatedly executes steps 2 through 7 until the relationship Mh=Mh0 is eventually satisfied (step 6). When the operation flow proceeds from step 6 to step 7, the horizontal position setting value is decreased if Mh>Mh0, or it is increased if Mh<Mh0.

Figure 29:
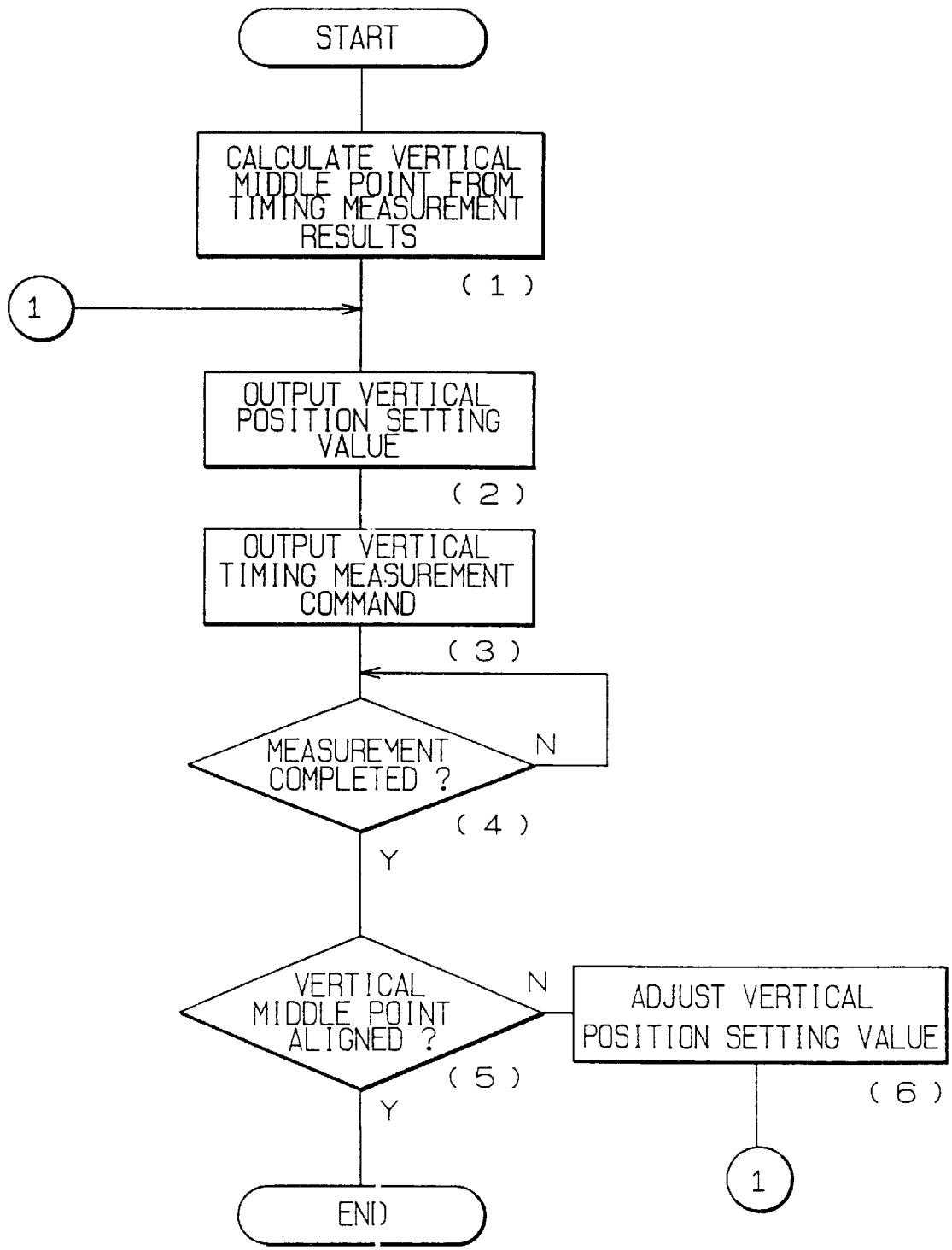
FIG. 29 is a flowchart showing the automatic vertical position correction.

Next, the microprocessor 11 performs automatic adjustment of the vertical position of the on-screen image G (step 6 shown in FIG. 23; refer to FIG. 29 for details). First, the microprocessor 11 calculates a theoretical vertical middle point Mv0 of the on-screen image G, produced from the input video signal, by using the vertical display start time T2$v$ and vertical display end time T3$v$ which are output from the measuring circuit 18 (step 1 shown in FIG. 29).

$$Mv0=T2v+(T3v-T2v)/2$$

The microprocessor 11 outputs an appropriate vertical position setting value to the D/A converter 12 (step 2), and the D/A converter 12 transmits the vertical position setting signal Svp to the vertical position adjusting circuit 24c so that the vertical position of the image G displayed on the CRT 25a is properly set.

The microprocessor 11 then sets the changeover switch 21 to the comparator 27 to transmit the vertical timing signal S5b from the comparator 27 to the measuring circuit 18, and outputs a vertical timing measurement command to the measuring circuit 18 (step 3). Consequently, the measuring circuit 18 can measure the vertical timing period T4$v$ and output it to the microprocessor 11.

When the reference voltage Ev applied to the comparator 27 is set to a level of the vertical deflection voltage S5a where the vertical scanning point of the on-screen image G coincides with the vertical middle point of the display screen of the CRT 25a, the vertical timing period T4$v$ represents the point in time at which the actual vertical scanning point of the on-screen image G passes the vertical middle point of the display screen of the CRT 25a. When measurement of the vertical timing period T4$v$ by the measuring circuit 18 is completed (step 4), the microprocessor 11 determines whether the relationship T4$v$=Mv0 satisfied, or whether the actual vertical position of the on-screen image G is satisfactory (step 5). When it is determined that T4$v$≠Mv0, the microprocessor 11 adjusts the vertical position setting value (step 6) and repeatedly executes steps 2 through 6, if necessary, until the relationship T4$v$=Mv0 is eventually satisfied (step 5).

When the operation flow proceeds from step 5 to step 6 of FIG. 29, the vertical position setting value is increased if T4$v$>Mv0, or it is decreased if T4$v$<Mv0.

FIGS. 30 and 31(A)–31(C) are diagrams showing the operation of a video monitor adjustment system according to the third invention.

Figure 30:
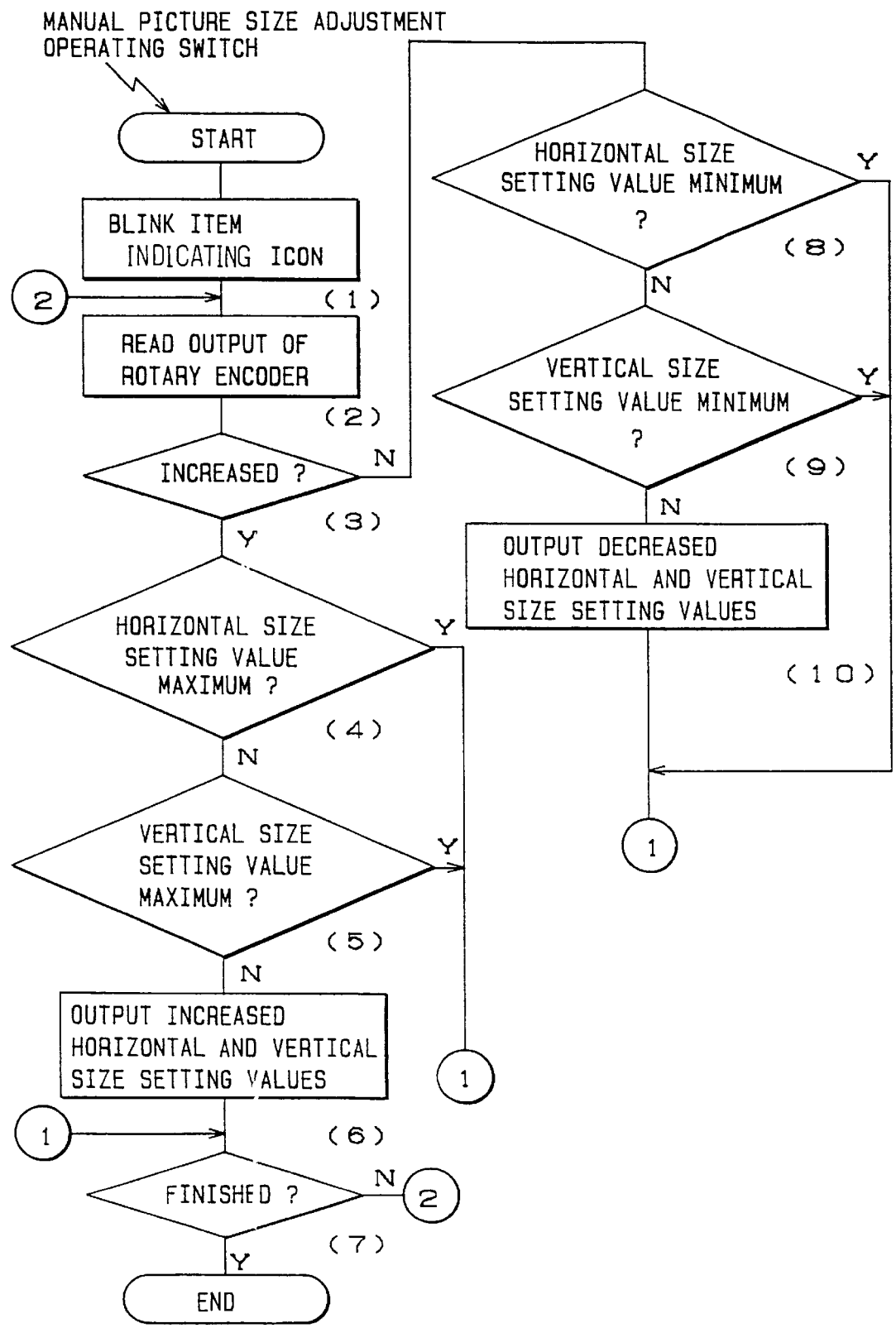
FIG. 30 is a flowchart showing the manual picture size adjustment operation according to the third invention.
Figure 31A:
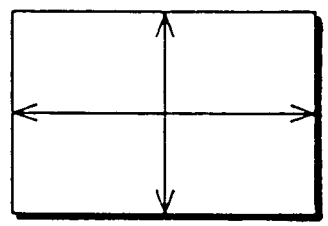
FIGS. 31(A) to 31(C) are diagrams showing examples of indicating icons displayed in picture size adjustment.
Figure 31B:
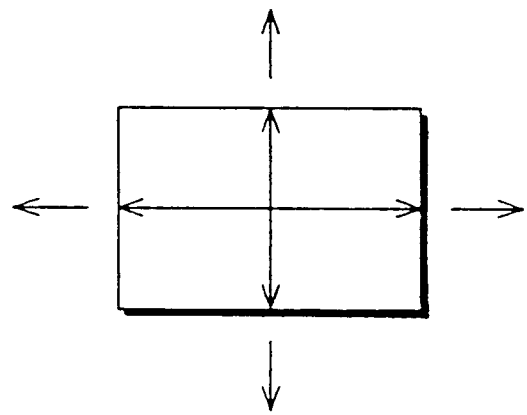
Figure 31C:
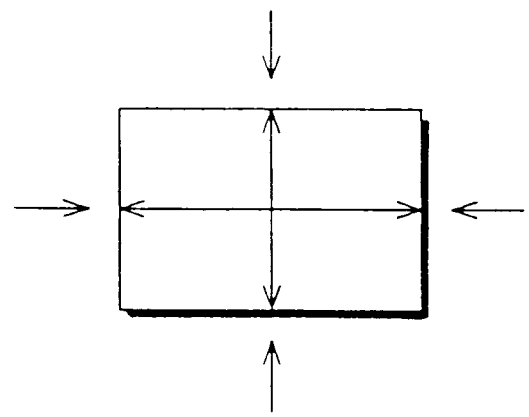

In this invention, the microprocessor 11 performs manual picture size adjustment operation shown in FIG. 30 in accordance with operation of the operating switch SW provided on the operator input unit 14. First, a blinking item indicating icon (FIG. 31(A)), representative of the picture size adjustment operation, is overlaid on the on-screen image G at an appropriate position thereof, prompting an operator input (step 1 shown in FIG. 30). Then, the microprocessor 11 reads an output value of the rotary encoder RC as it is manually operated (step 2). When an increase in the output value is detected (step 3), the microprocessor 11 verifies that neither the horizontal size setting value nor the vertical size setting value is at their upper limits (steps 4 and 5), then increases both the horizontal and vertical size setting values and outputs them to the D/A converter 12 (step 6). Consequently, the D/A converter 12 outputs the horizontal size setting signal Shs and vertical size setting signal Svs so that the horizontal and vertical sizes of the on-screen image G can be simultaneously increased. A process indicating icon (FIG. 31(B)), which shows that the process for increasing the picture size is under way, may be overlaid on the on-screen image G at an appropriate position thereof in the above operating sequence.

In the above-described manual picture size adjustment operation, the size of the on-screen image G can be continuously increased by turning the rotary encoder RC in its increasing direction since steps 2 through 7 are repeatedly executed until the sequence is terminated by using the operating switch SW (step 7).

When the rotary encoder RC is turned to its decreasing direction (step 3), the microprocessor 11 verifies that neither the horizontal size setting value nor the vertical size setting value is at their lower limits (steps 8 and 9), then decreases both the horizontal and vertical size setting values and outputs them to the D/A converter 12 (step 10). Consequently, the D/A converter 12 outputs the horizontal size setting signal Shs and vertical size setting signal Svs so that the horizontal and vertical sizes of the on-screen image G can be simultaneously decreased. Aprocess indicating icon (FIG. 31(C)), which shows that the process for decreasing the picture size is under way, may be overlaid on the on-screen image G at an appropriate position thereof in this operating sequence.

In this operation, the size of the on-screen image G can be continuously decreased by turning the rotary encoder RC in its decreasing direction since steps 2, 3, 8 through 10 and 7 are repeatedly executed until the sequence is terminated by using the operating switch SW (step 7). As is understood from the foregoing discussion, it is possible to continuously increase or decrease the size of the on-screen image G by increasing or decreasing the horizontal or vertical size setting value in accordance with an increase or a decrease in the value of the operating parameter controlled by the rotary encoder RC.

When the horizontal and vertical size setting values are increased or decreased in step 6 or 10 shown in FIG. 30, the ratio between the two values is maintained at a value which is predetermined in accordance with the aspect ratio of the on-screen image G.

The measuring circuit 18 may constantly measure the horizontal scanning period T1$h$ and vertical scanning period T1$v$ and transmit an interrupt signal to the microprocessor 11 to cause it to automatically run the main program shown in FIG. 23, each time a variation in the horizontal scanning frequency Fh=1/T1$h$ or vertical scanning frequency Fv=1/T1$v$ of the externally input video signal is detected. In addition, the microprocessor 11 may automatically execute a specific automatic adjustment operation each time a variation in the externally input video signal is detected.

Figure 32:
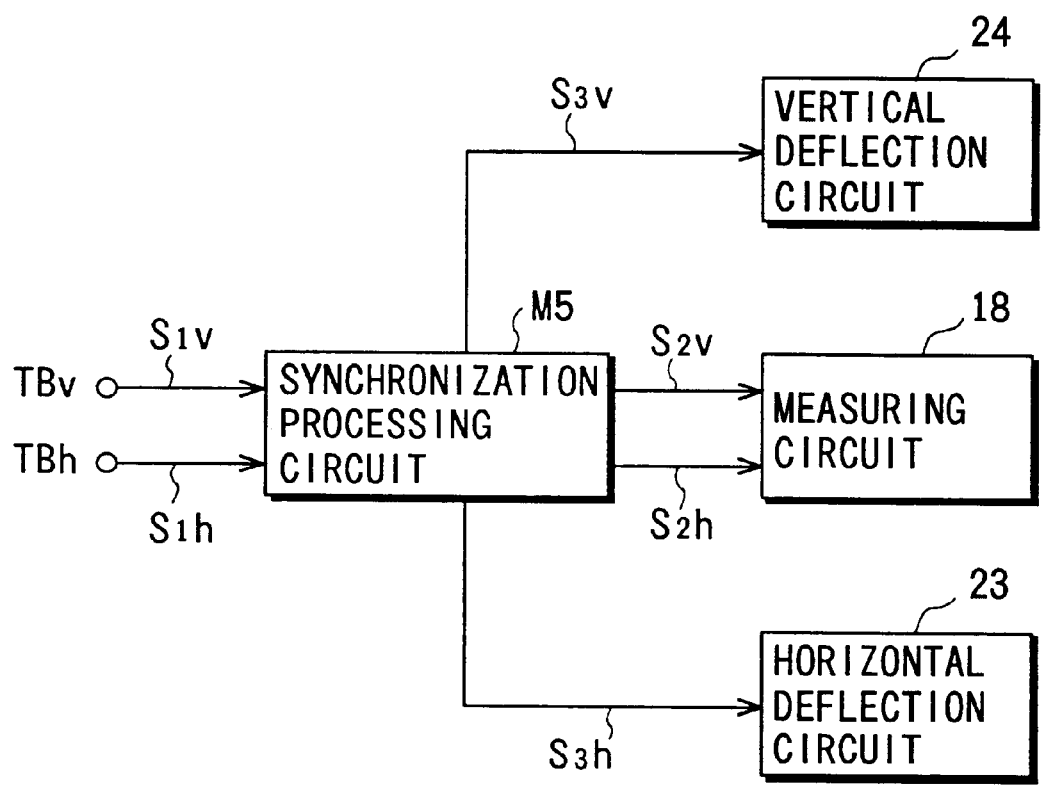
FIG. 32 is a circuit diagram for monitoring vertical and horizontal synchronizing signals.

Alternatively, the measuring circuit 18 may monitor the polarities of the externally input vertical synchronizing signal S1$v$ and horizontal synchronizing signal S1$h$ and transmit an interrupt to the microprocessor 11 to cause it to automatically run the main program shown in FIG. 23 each time a variation in polarity is detected. For monitoring the polarities of the vertical synchronizing signal S1$v$ and horizontal synchronizing signal S1$h$, the synchronization processing circuit M5 should output the vertical synchronizing signal S2$v$ and horizontal synchronizing signal S2$h$, having the same polarities as the vertical synchronizing signal S1$v$ and horizontal synchronizing signal S1$h$, to the measuring circuit 18 (FIG. 32), and also output a horizontal drive signal S3$h$ and a vertical drive signal S3$v$ having specific polarities to the vertical deflection circuit 24 and horizontal deflection circuit 23, respectively, regardless of the polarities of the vertical synchronizing signal S1v and horizontal synchronizing signal S1h.

Furthermore, the rotary encoder RC, manually operated for the manual picture size adjustment operation shown in FIG. 30, may be replaced by an operating switch which can vary an operating parameter in either its increasing or decreasing direction since it is sufficient if the size of the on-screen image G can be varied in both directions.

Figure 33:
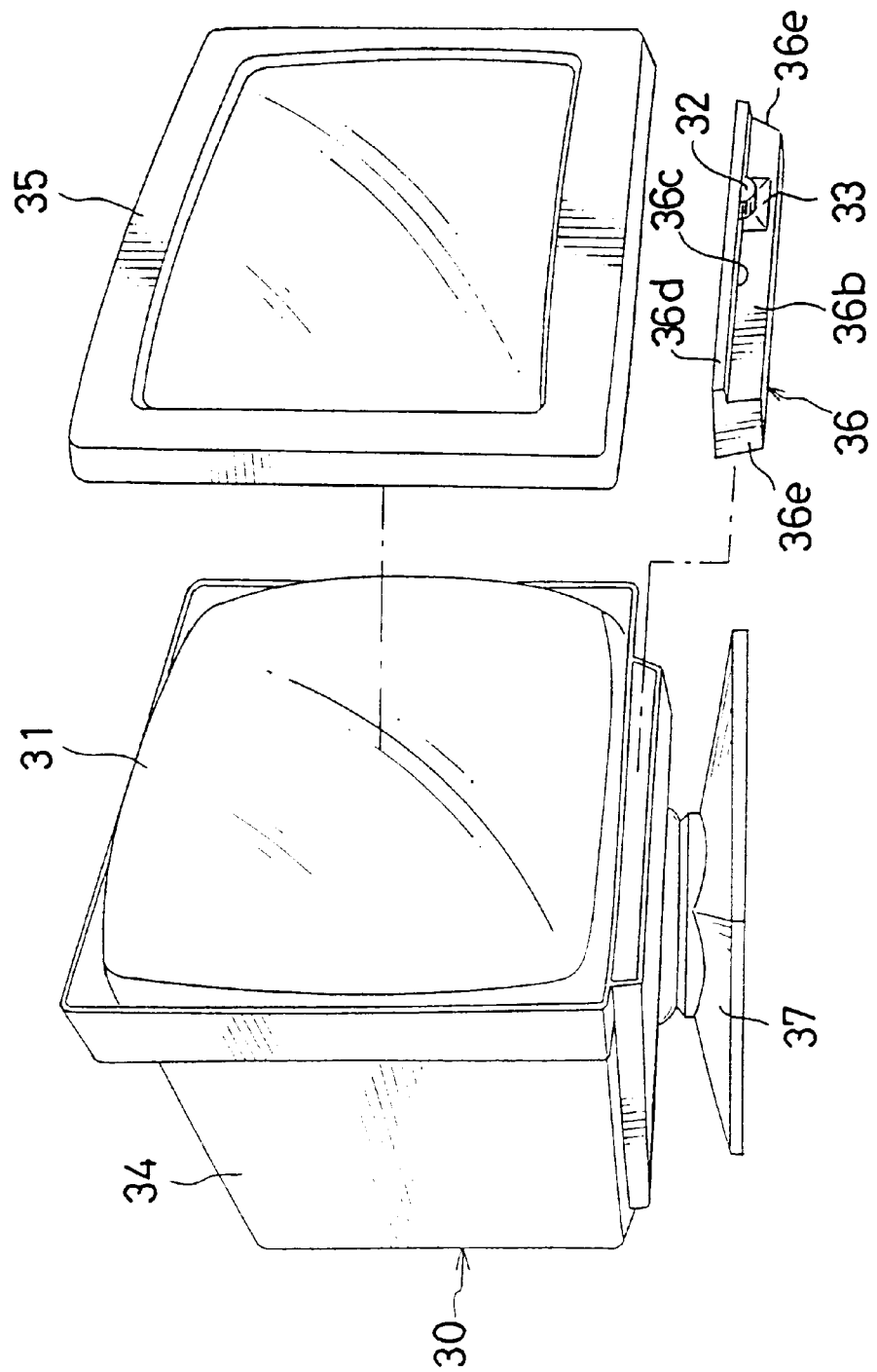
FIG. 33 shows an external view of a video monitor to which the present invention is applied.

Moreover, an operator input unit used for a video monitor adjustment system can be constructed based on a combination of a manually operated rotary encoder 32 and an operating switch 33 located at the bottom of a display section 31 of a video monitor 30 as shown in FIG. 33. Specifically, part of an operating knob of the rotary encoder 32 and an operating faceplate of the operating switch 33 are exposed through the surface of a case 34 of the 30.

A bezel 35 is mounted around the display section 31 (i.e., screen face of a color CRT housed in the case 34) of the video monitor 30 and an operating panel 36 is fixed at the bottom of the bezel 35. The video monitor 30 is mounted on a base 37 so that the display section 31 can be horizontally oriented in a desired direction and set to a desired tilt angle.

Figure 34:
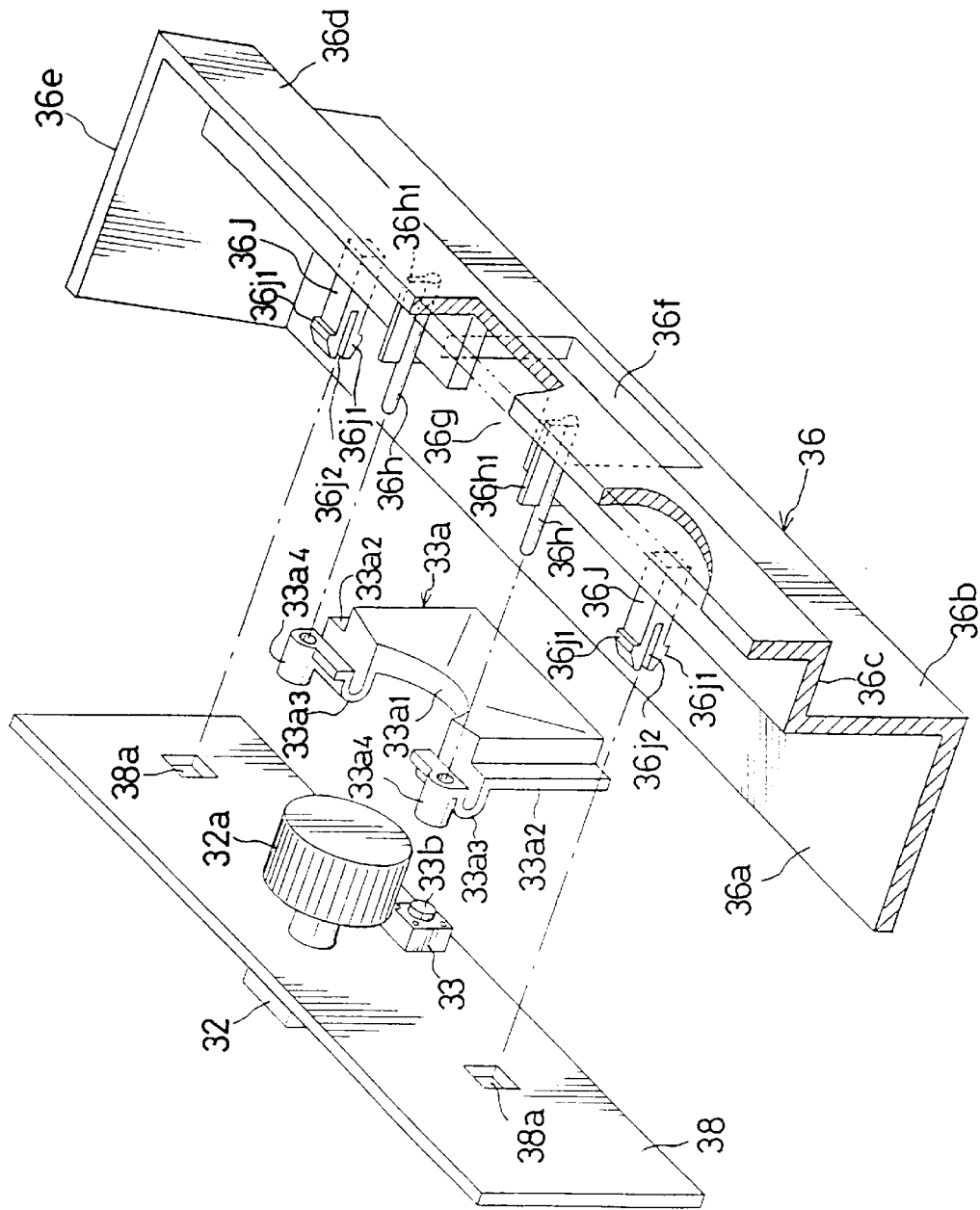
FIG. 34 is a perspective diagram showing the construction of the operating section shown in FIG. 33.

The front of the operating panel 36 is shaped in steplike fashion as shown in FIG. 34. Specifically, the operating panel 36 includes a lower-front plate portion 36b rising vertically from a bottom plate portion 36a, an overhang portion 36c projecting forward from the lower-front plate portion 36b and an upper-front plate portion 36d rising vertically from the overhang portion 36c. In addition, side plate portions 36e are formed at both sides of the operating panel 36. FIG. 34 shows one of these side plate portions 36e.

Figure 35:
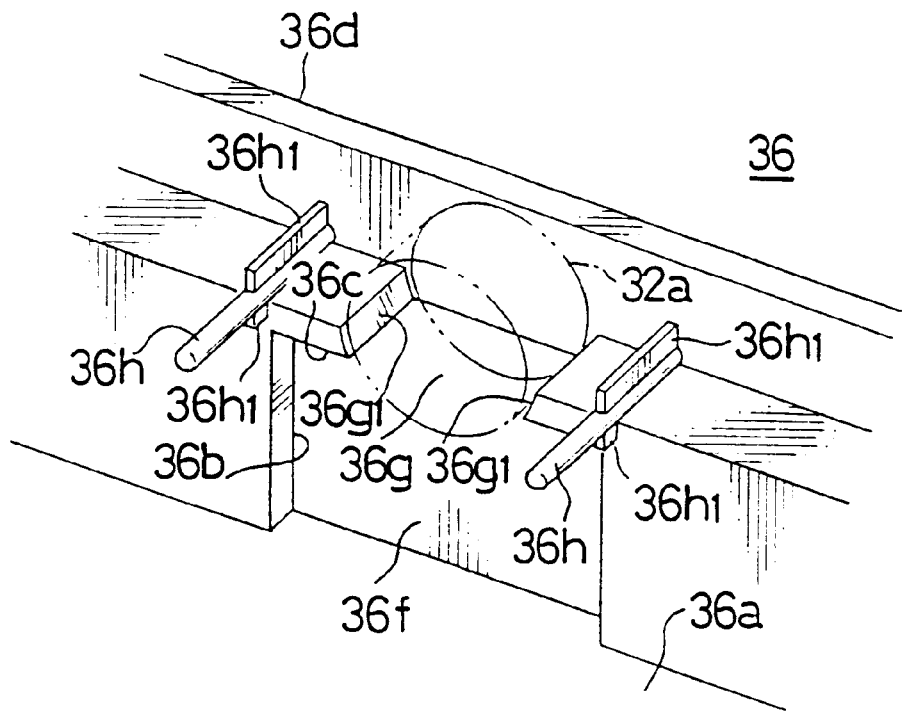
FIG. 35 is a fragmentary enlarged perspective diagram of an operating panel.

A rectangle window 36f, or opening, is formed in the lower-front plate portion 36b. Further, a cutout 36g corresponding to the window 36f is formed in the overhang portion 36c. The cutout 36g has a shorter width than the window 36f and both left and right edges of the cutout 36g are shaped to form cylindrical surface segments 36g1 fanning out upward as shown in FIG. 35.

At upper left and right sides of the window 36f, support rods 36h for supporting an operating part 33a, which serves as an operating faceplate, are formed projectingly in the rearward direction of the operating panel 36 by use of the top surface of the overhang portion 36C. Reinforcing ribs 36h1 are formed on the top and bottom sides of each supporting rod 36h. On the rear side of the lower-front plate portion 36b, prism-shaped rods 36j are projectingly formed on the left and right sides of the window 36f, each rod 36j having at its far end upper and lower arrowhead-shaped stopper elements 36j1 with a slit 36j2 formed therebetween.

The operating part 33a is shaped into a rectangular platelike form with an arc-shaped cutout 33a1 formed in its top side. There are formed stopper ribs 33a2 on the left and right sides of the operating part 33a. Left and right top portions of the operating part 33a are bent into a semicircular shape to form fixing portions 33a4 joined by bent portions 33a3 having elasticity. The operating part 33a is shaped to fit into the window 36f in the operating panel 36, wherein the fixing portions 33a4 align with the support rods 36h. Specifically, the operating part 33a can be installed inside the operating panel 36 by inserting the support rods 36h into the respective fixing portions 33a4. The front surface of the operating part 33a is recessed aslant toward the cutout 33a1, and the operating part 33a slightly projects frontward beyond the front surface of the lower-front plate portion 36b when installed.

The above-described operating part 33a can be made by one-piece molding any rigid plastic material, such as acrylonitrilebutadiene-styrene (ABS) resin or rigid polyvinyl chloride.

The rotary encoder 32 and operating switch 33 are mounted on a printed circuit board 38. Mounting square holes 38a are formed in the printed circuit board 38. The rotary encoder 32 is mounted on the rear side of the printed circuit board 38 with a shaft of the rotary encoder 32 passing through the printed circuit board 38, and a cylindrical operating knob 32a is fitted to the front end of the shaft. The outer cylindrical surface of the operating knob 32a is knurled for preventing slippage. When the operating knob 32a is turned clockwise or counterclockwise, the rotary encoder 32 outputs an electrical pulse signal, representing the turning direction and the amount of rotation, to an external circuit whatever connected thereto. The width of the operating part 33a is larger than the outside diameter of the operating knob 32a and the cutout 33a 1 in the operating part 33a is made to fit the outside diameter of the operating knob 32a.

The operating switch 33 is mounted on the front side of the printed circuit board 38 just beneath the rotary encoder 32. The operating switch 33 has a self-returning actuator 33b on its front side and outputs an electrical signal when the actuator 33b is pressed.

The printed circuit board 38 is fixed to the inside of the operating panel 36 as the rods 36j are inserted into the respective mounting square holes 38a. When the printed circuit board 38 is installed, its rear side is positioned by the stopper elements 36j1 of the rods 36j while the front side is positioned by the rear surfaces of the fixing portions 33a4 of the operating part 33a which is supported by the support rods 36h. The operating part 33a is set in position as the front surfaces of the fixing portions 33a 4 come into contact with the reinforcing ribs 36h1 of the support rods 36h. It would be recognized that when the printed circuit board 38 is mounted on the rods 36j, the printed circuit board 38 is fixed in position, together with the operating part 33a which is mounted on the support rods 36h.

Figure 36:
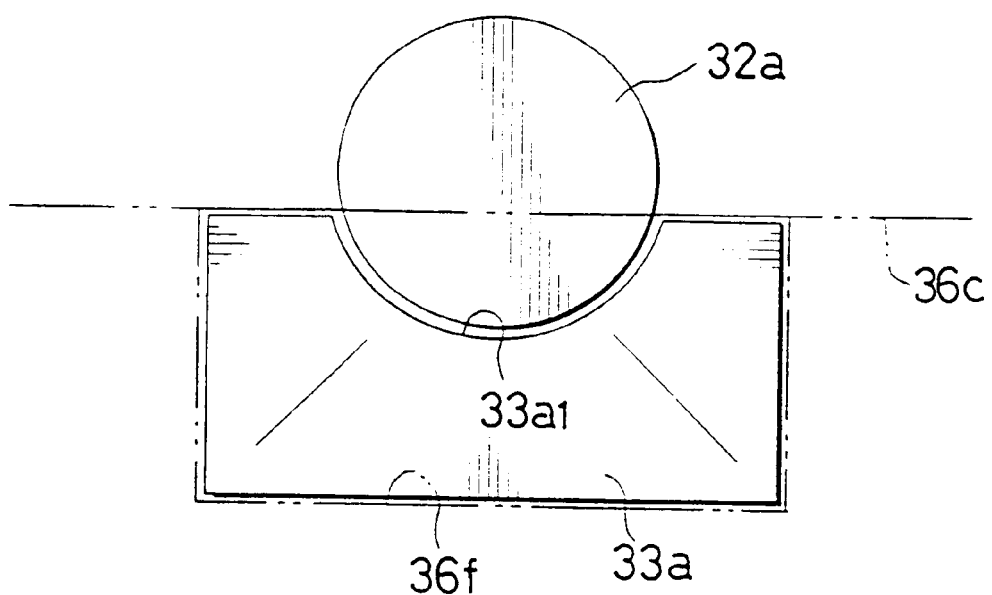
FIG. 36 is a frontal layout of an operating knob and an operating section.

When the printed circuit board 38 is fixed to the operating panel 36 in this manner, an outer surface of the operating knob 32a of the rotary encoder 32 partially protrudes through the cutout 36g to the outside of the overhang portion 36c (shown by an alternate long and two short dashed lines in FIG. 35; also refer to FIG. 36). Part of the outer surface of the operating knob 32a, fits into the cutout 33a1 in the operating part 33a and the actuator 33b of the operating switch 33 faces the rear surface of the operating part 33a with a narrow gap d left between them, as shown in FIG. 37.

With the operator input unit thus constructed, an operator can choose desired adjustment items on the screen and alter the value of any adjustment parameter by manipulating the operating knob 32a with a finger F to turn the rotary encoder 32 clockwise or counterclockwise, while observing information displayed on the display section 31 of the video monitor 30. Adjustments can be made in this manner since the outer surface of the operating knob 32a of the rotary encoder 32 partially protrudes downward beyond the bottom surface of the overhang portion 36c. After choosing a desired adjustment item and altering the value of the corresponding adjustment parameter by use of the rotary encoder 32, the operator can confirm the adjustment item and adjustment parameter settings by removing the finger F from the operating knob 32a and pressing the operating part 33a to push the actuator 33b of the operating switch 33 (refer to FIG. 38). Since the operating part 33a is supported by the bent portions 33a3 having elasticity, it can automatically return to its normal position shown in FIG. 37 when the finger F is removed.

Since the operating part 33a extends to both the left and right underneath the operating knob 32a (refer to FIG. 35), the operator can push the operating part 33a immediately at a position where the finger F has been removed from the operating knob 32a, without moving the finger F along the outer surface of the operating knob 32a after turning it clockwise or counterclockwise.

Figure 37:
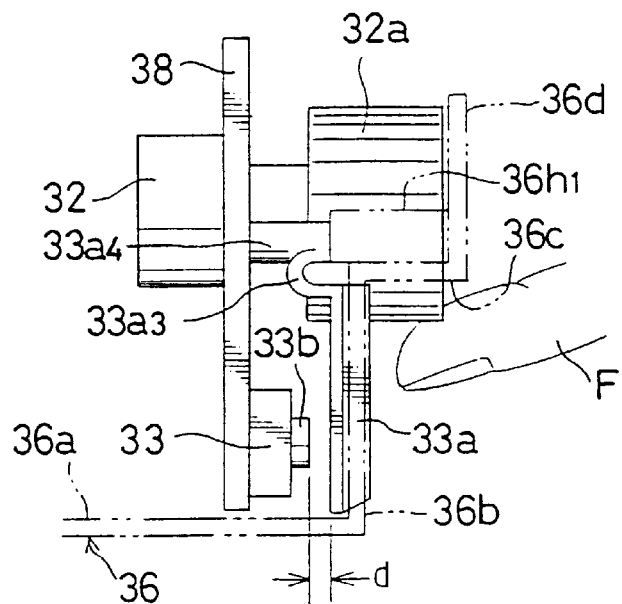
FIG. 37 is a side view illustrating how the operating knob is operated.
Figure 38:
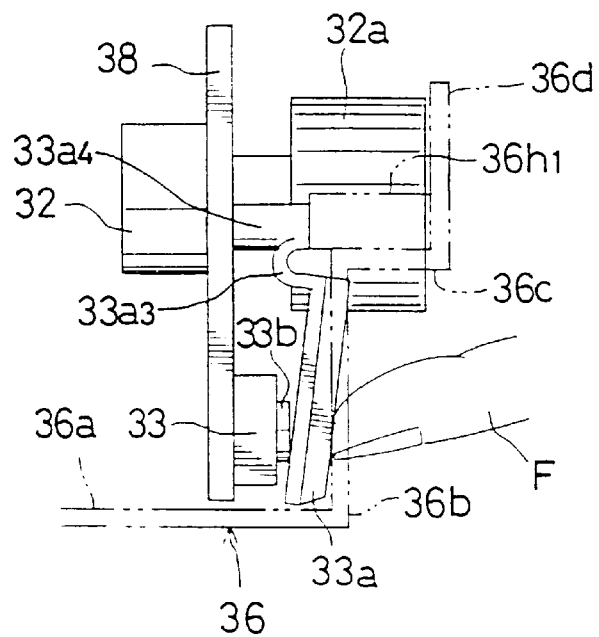
FIG. 38 is a side view illustrating how the operating section is operated.

Referring to FIGS. 37 and 38, the lower edge of the operating part 33a forms a slant surface inclined toward the front surface to prevent inference with the bottom plate portion 36a that may occur when the operating part 33a is pressed. If, however, an overall stroke required for the operating part 33a, including the gap d and the operating switch 33, is small, such a slant surface is not necessarily required.

Further, instead of pressing the operating part 33a with the tip of the finger F as shown in FIG. 38, the operating part 33a may be pressed by the nail side of the finger F with the proximal interphalangeal joint of the finger F bent. The finger F used for pressing the operating part 33a may be either an index finger or a middle finger.

According to the operator input unit constructed as described above, the finger used for turning the operating knob clockwise or counterclockwise can be immediately, and securely, diverted to an action of pressing the operating part without the need for moving the finger along the outer surface of the operating knob. This construction serves to enable quick blind-touch operation and to prevent operational errors.

Obviously, numerous modifications and variations of the present invention are possible in light of the above teachings. It is therefore to be understood that within the scope of the appended claims, the invention maybe practiced otherwise than as specifically described herein.

What is claimed as new and desired to be secured by Letters Patent of the United States is:

1. An automatic video monitor adjustment system, comprising:
   a digital-to-analog (D/A) converter;
   a vertical deflection circuit;
   a microprocessor which transmits a horizontal size setting signal to a horizontal deflection circuit of a video monitor and transmits a vertical size setting signal to the vertical deflection circuit through the D/A converter;
   a measuring circuit for measuring the timing of an input video signal while measuring a horizontal scanning period and a vertical scanning period;
   a video amplifier; and
   a mixer;
   wherein the microprocessor calculates effective scanning ratios of the input video signal based on measurement results fed from the measuring circuit to output the horizontal size setting signal and the vertical size setting signal, the horizontal size setting signal and the vertical size setting signal respectively comprising a horizontal size setting value and a vertical size setting value corresponding to the effective scanning ratios to the video monitor;
   the microprocessor detects a variation of the timing of the input video signal based on the measurement result of the horizontal scanning period and the vertical scanning period to output the horizontal size setting value and the vertical size setting value to the video monitor each time the variation is detected; and
   a video signal which is output from the video amplifier is input to the measuring circuit via the mixer.

2. The automatic video monitor adjustment system as defined in claim 1, wherein the microprocessor transmits gain setting signals for individual colors and a contrast setting signal to the video amplifier through the D/A converter when the measuring circuit measures the input video signal timing.

3. A video monitor adjustment system, comprising:
   an operator input unit which allows an operator to input:
      a request of a menu image and provides the operator with a plurality of selective adjustment items,
      a selection of a desired one of the plurality of adjustment items, and
      adjustment data for a selected adjustment item;
   an adjusting device which adjusts operation performance of a video monitor in accordance with the inputted adjustment data;
   a display image generator which generates a display image to be displayed on a display screen of the video monitor; and
   a controller which is responsive to the operator input unit, and controls the display image generator to:
      generate a display image having the menu image when the menu image is requested by the operator input unit, and
      generate a display image having an adjustment image for a selected adjustment item for enabling the operator to adjust the video monitor when the selection of the adjustment item being executed;
   wherein the operator input unit further allows the operator to input a request of reducing the size of menu image, and the controller controls the display image generator to generate a display image having a smaller menu image in accordance with the reducing request of the operator input unit.

4. The video monitor adjustment system as defined in claim 3, wherein the operator input unit includes a rotary encoder, and further allows the operator to input a request for a help message, and the controller controls the display image generator to generate a display image having a help message explaining technical details or adjustment procedures, the help message being scrollable in accordance with an operation of the rotary encoder.

5. A video monitor adjustment system, comprising:
   an operator input unit which allows an operator to input:
      a request of a menu image and provides the operator with a plurality of selective adjustment items,
      a selection of a desired one of the plurality of adjustment items, and
      adjustment data for a selected adjustment item;
   an adjusting device which adjusts operation performance of a video monitor in accordance with the inputted adjustment data;
   a display image generator which generates a display image to be displayed on a display screen of the video monitor; and
   a controller which is responsive to the operator input unit, and controls the display image generator to:
      generate a display image having the menu image when the menu image is requested by the operator input unit, and
      generate a display image having an adjustment image for a selected adjustment item for enabling the operator to adjust the video monitor when the selection of the adjustment item being executed;

wherein the controller includes a detector which detects the frequency of a video signal input to the video monitor, and controls the display image generator to generate a display image having an error message indicative of the input video signal being beyond a predetermined limit when the frequency of the input video signal is detected to be beyond the predetermined limit.

6. The video monitor adjustment system as defined in claim 5, wherein the video monitor includes a video amplifier circuit, a horizontal deflection circuit, a vertical deflection circuit, a synchronization processing circuit, and a clamping circuit;

the adjusting device includes a D/A converter; and the controller isolates the horizontal deflection circuit from the synchronization processing circuit, determines a horizontal oscillating frequency via the D/A converter, causes a vertical oscillating frequency to follow the horizontal oscillating frequency, and switches the clamping circuit to the horizontal deflection circuit, when the display image having the error message is displayed.

7. The video monitor adjustment system as defined in claim 6, wherein the controller isolates the video amplifier circuit from an input terminal when the display image having the error message is displayed.

8. A video monitor adjustment system, comprising:

an operator input unit which allows an operator to input:
a request of a menu image and provides the operator with a plurality of selective adjustment items,
a selection of a desired one of the plurality of adjustment items, and
adjustment data for a selected adjustment item;

an adjusting device which adjusts operation performance of a video monitor in accordance with the inputted adjustment data;

a display image generator which generates a display image to be displayed on a display screen of the video monitor; and a controller which is responsive to the operator input unit, and controls the display image generator to:
generate a display image having the menu image when the menu image is requested by the operator input unit, and
generate a display image having an adjustment image for a selected adjustment item for enabling the operator to adjust the video monitor when the selection of the adjustment item being executed;
wherein the controller includes a detector which detects whether a video signal has been input to the video monitor, and controls the display image generator to generate a display image having an error message indicative of the video signal having not been input when the detector detects no input video signal.

9. The video monitor adjustment system as defined in claim 8, wherein the monitor includes a video amplifier circuit, a horizontal deflection circuit, a vertical deflection circuit, a synchronization processing circuit, and a clamping circuit;

the adjusting device includes a D/A converter; and the controller isolates the horizontal deflection circuit from the synchronization processing circuit, determines a horizontal oscillating frequency via the D/A converter, causes a vertical oscillating frequency to follow the horizontal oscillating frequency, and switches the clamping circuit to the horizontal deflection circuit, when the display image having the error message is displayed.

10. The video monitor adjustment system as defined in claim 9, wherein the controller isolates the video amplifier circuit from an input terminal when the display image having the error message is displayed.

11. A video monitor adjustment system, comprising:

an operator input unit including a plurality of operating switches for selecting a plurality of selective adjustment items, respectively, and an adjustment data input portion for inputting adjustment data for a selected adjustment item;

an adjusting device which adjusts the operation performance of the video monitor in accordance with inputted adjustment data;

a display image generator which generates a display image to be displayed on a display screen of the video monitor; and a controller which is responsive to the operator input unit, and controls the display image generator to generate a display image having an adjustment image for a selected adjustment item for enabling the operator to adjust the video monitor;

wherein the controller includes a detector which detects the frequency of a video signal inputted to the video monitor, and controls the display image generator to generate a display image having an error message indicative of the input video signal being beyond a predetermined limit when the frequency of the input video signal is detected to be beyond the predetermined limit.

12. The video monitor adjustment system as defined in claim 11, wherein the monitor includes a video amplifier circuit, a horizontal deflection circuit, a vertical deflection circuit, a synchronization processing circuit, and a clamping circuit;

the adjusting device includes a D/A converter; and the controller isolates the horizontal deflection circuit from the synchronization processing circuit, determines a horizontal oscillating frequency via the D/A converter, causes a vertical oscillating frequency to follow the horizontal oscillating frequency, and switches the clamping circuit to the horizontal deflection circuit, when the display image having the error message is displayed.

13. The video monitor adjustment system as defined in claim 12, wherein the controller isolates the video amplifier circuit from an input terminal when the display image having the error message is displayed.

14. A video monitor adjustment system, comprising:

an operator input unit including a plurality of operating switches for selecting a plurality of selective adjustment items, respectively, and an adjustment data input portion for inputting adjustment data for a selected adjustment item;

an adjusting device which adjusts the operation performance of the video monitor in accordance with inputted adjustment data;

a display image generator which generates a display image to be displayed on a display screen of the video monitor; and a controller which is responsive to the operator input unit, and controls the display image generator to generate a display image having an adjustment image for a selected adjustment item for enabling the operator to adjust the video monitor;

wherein the controller includes a detector which detects whether a video signal has been input to the video monitor, and controls the display image generator to generate a display image having an error message indicative of the video signal having not been input when the detector detects no input video signal.

15. The video monitor adjustment system as defined in claim 14, wherein the monitor includes a video amplifier circuit, a horizontal deflection circuit, a vertical deflection circuit, a synchronization processing circuit, and a clamping circuit;

the adjusting device includes a D/A converter; and the controller isolates the horizontal deflection circuit from the synchronization processing circuit, determines a horizontal oscillating frequency via the D/A converter, causes a vertical oscillating frequency to follow the horizontal oscillating frequency, and switches the clamping circuit to the horizontal deflection circuit, when the display image having the error message is displayed.

16. The video monitor adjustment system as defined in claim 15, wherein the controller isolates the video amplifier circuit from an input terminal when the display image having the error message is displayed.

* * * * *